United States Patent [19]

Peng

[11] Patent Number: 4,682,548
[45] Date of Patent: Jul. 28, 1987

[54] REFUSE DISPOSING METHOD AND THE APPARATUS THEREOF

[76] Inventor: Chen H. Peng, 2nd Floor, No. 36, Chi-Li 1st Street, Chung-Li City, Taoyuan, Hsien, Taiwan

[21] Appl. No.: 725,388

[22] Filed: Apr. 22, 1985

Related U.S. Application Data

[63] Continuation-in-part of Ser. No. 550,397, Nov. 10, 1983, abandoned.

[51] Int. Cl.⁴ .............................................. F23G 5/02
[52] U.S. Cl. .................................. 110/222; 110/346; 110/235
[58] Field of Search ...................... 110/222, 346, 235

[56] References Cited

U.S. PATENT DOCUMENTS

| | | | |
|---|---|---|---|
| 2,026,366 | 12/1935 | Stehli | 110/222 |
| 2,213,668 | 9/1940 | Dundas et al. | 110/222 |
| 3,670,669 | 6/1972 | Hoad | 110/222 |
| 3,848,548 | 11/1974 | Bolejack, Jr. et al. | 110/238 |
| 3,932,280 | 1/1976 | Anderson | 110/222 |
| 3,962,044 | 6/1976 | Mackenzie | 110/346 |
| 4,121,524 | 10/1978 | Voelskow et al. | 110/220 |
| 4,133,273 | 1/1979 | Glennon | 110/346 |
| 4,452,152 | 6/1984 | John et al. | 110/162 |

*Primary Examiner*—Henry C. Yuen
*Attorney, Agent, or Firm*—Knobbe, Martens, Olson & Bear

[57] ABSTRACT

A refuse disposing method includes at least the steps of (a) gathering the refuse at a first place; (b) making the refuse from the place into smaller ones by tearing; (c) magnetically stripping ferruginous materials from the refuse at step (b); (m) burning the refuse at a combustion chamber with the refuse acting as fuels; and (l) preheating the refuse before which is in the combustion chamber by the heat generated in the combustion chamber. The apparatus thereof at least includes 5 means for respectively performing the above 5 steps.

27 Claims, 47 Drawing Figures

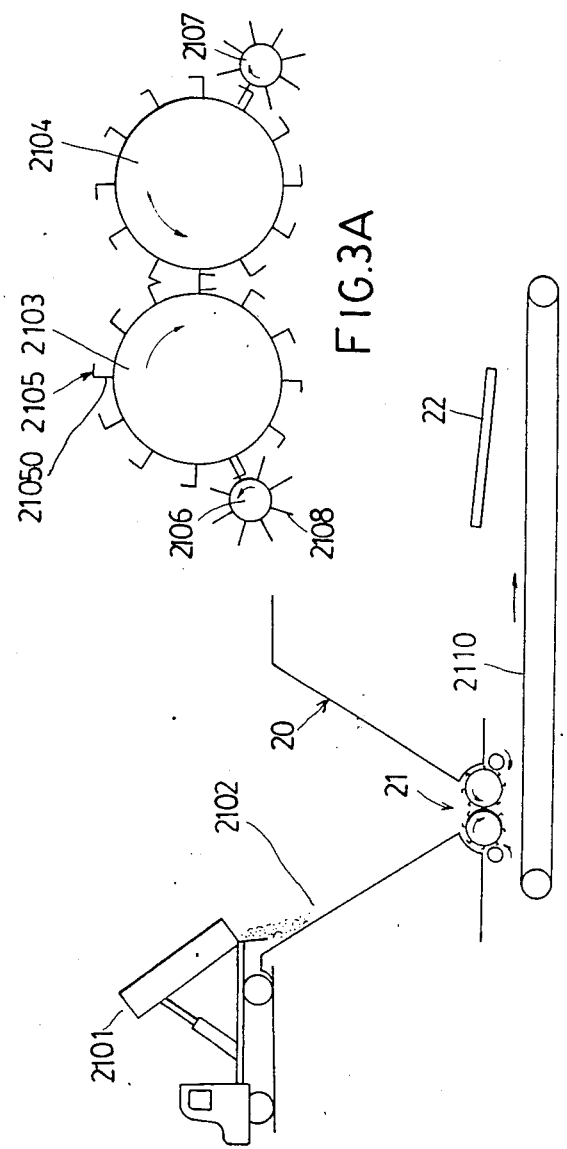

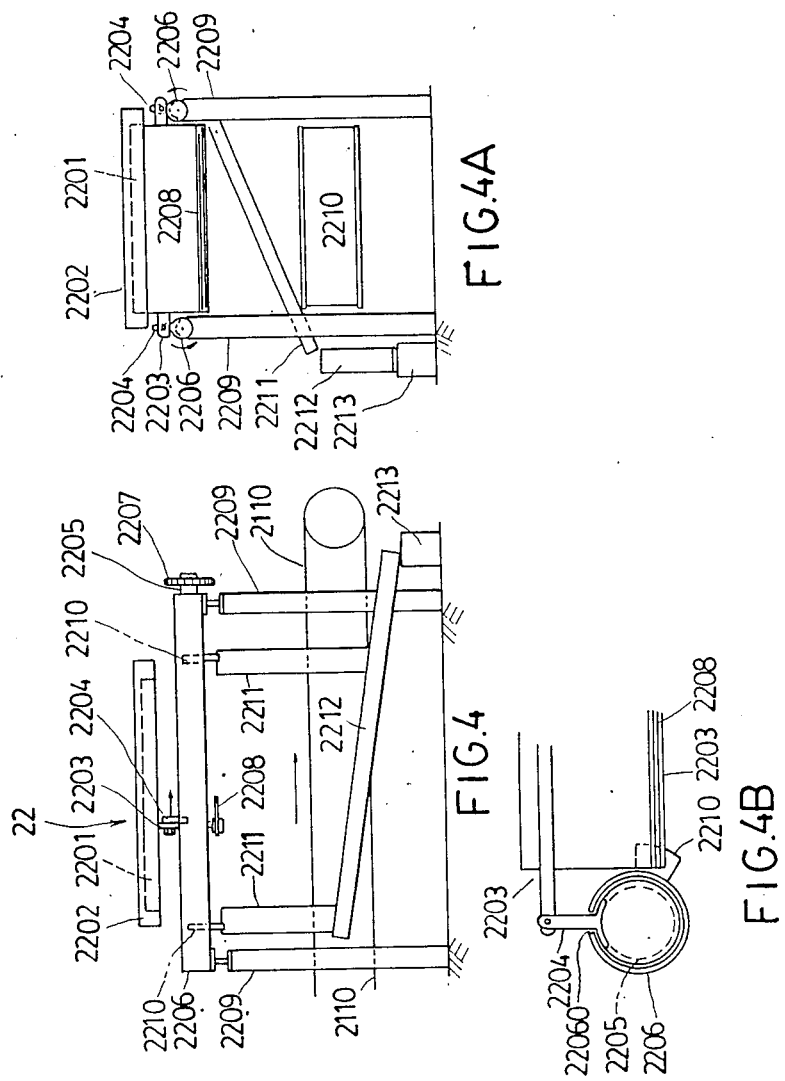

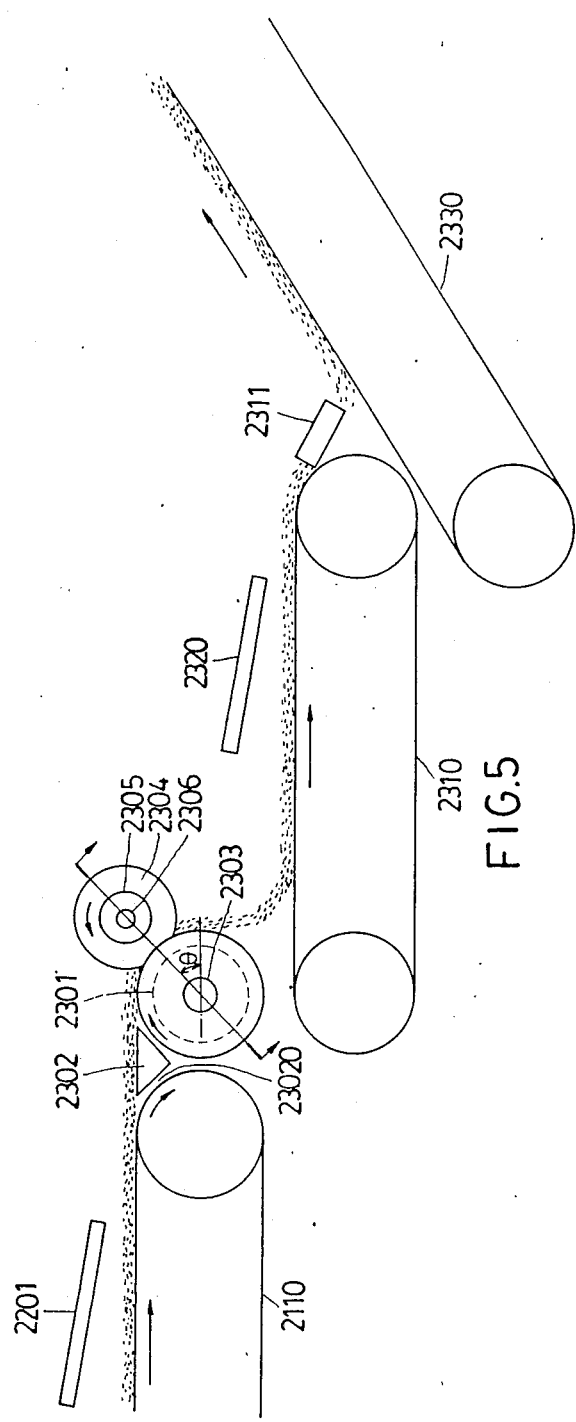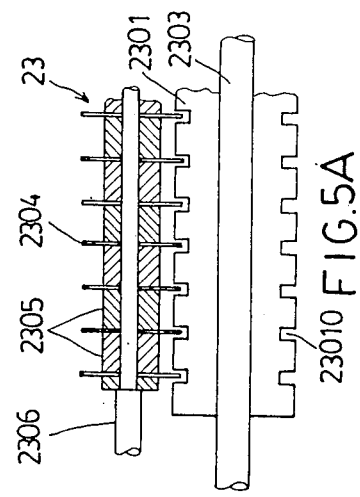

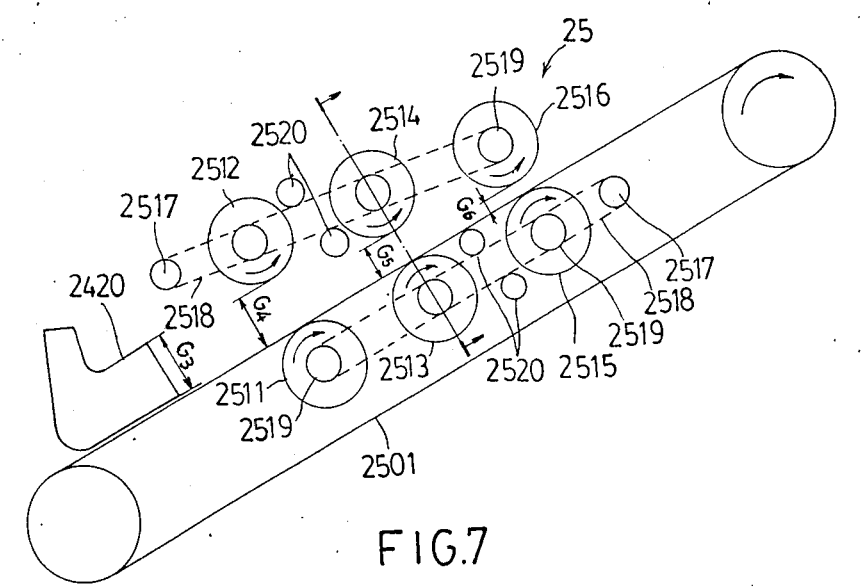
FIG.7
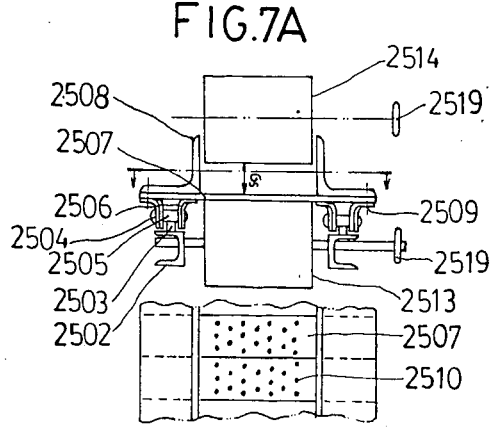
FIG.7A
FIG.7B
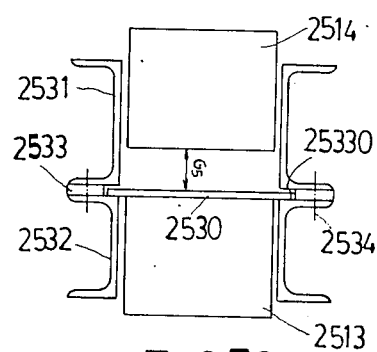
FIG.7C

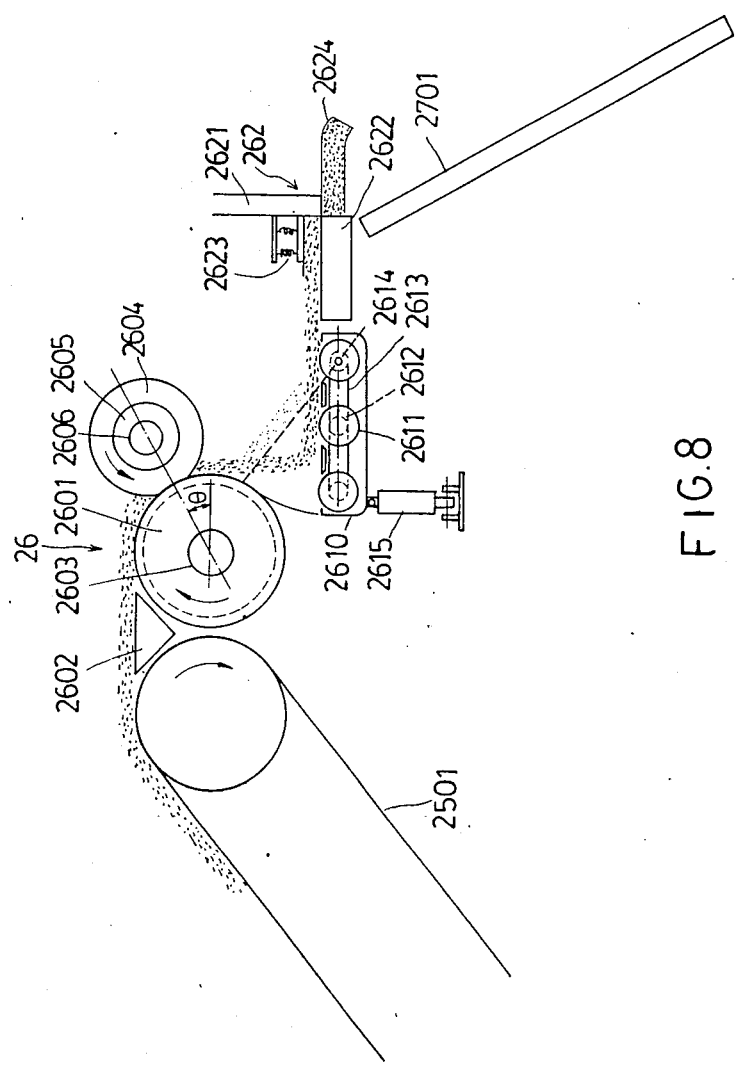

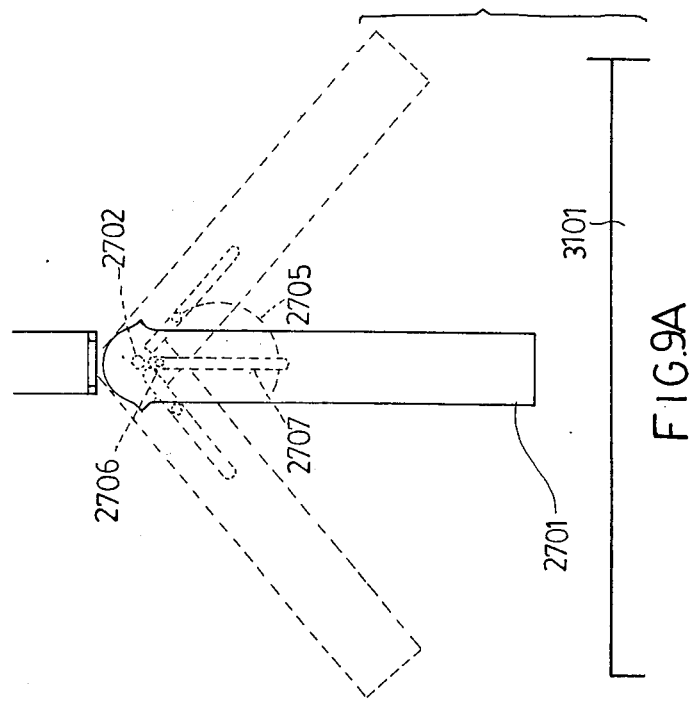
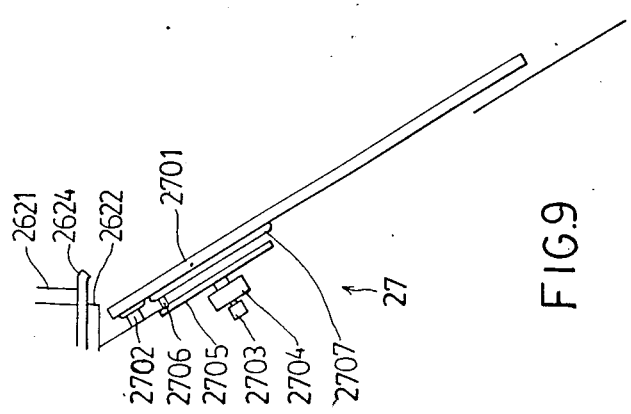

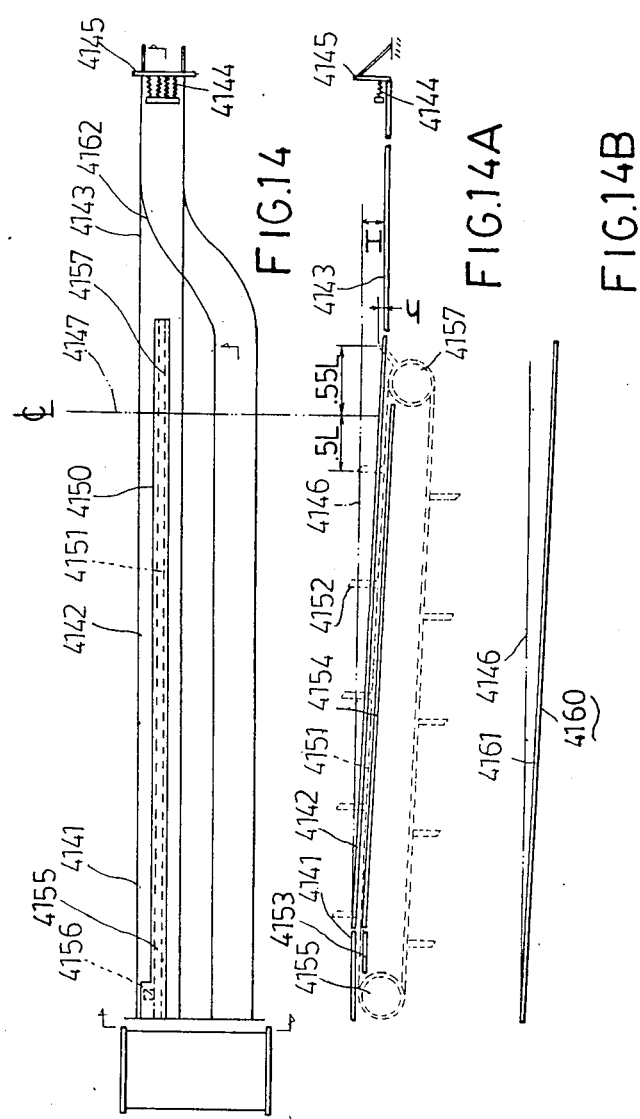

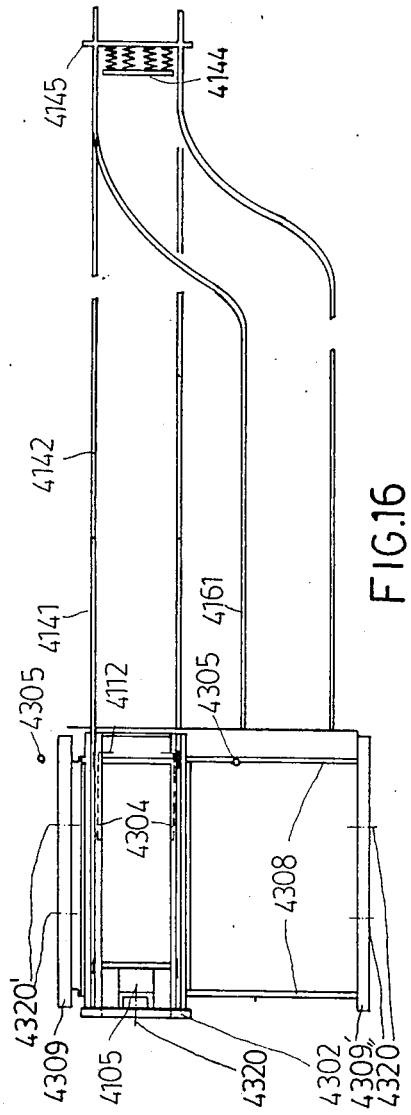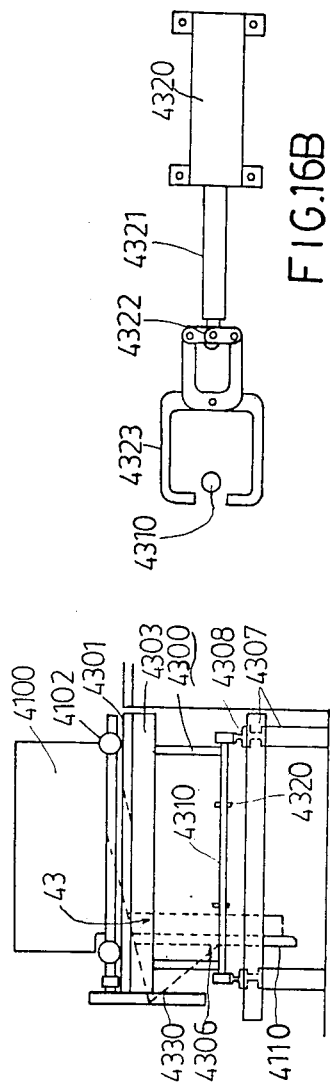

REFUSE DISPOSING METHOD AND THE APPARATUS THEREOF

CROSS-REFERENCE TO RELATED APPLICATION

This application is a continuation-in-part of copending U.S. Ser. No. 550,397, filed Nov. 10, 1983, now abandoned.

BACKGROUND OF THE INVENTION

Most (about 90%) of the refuse in this world is buried underground and the rest is disposed by incineration. Burying the refuse underground has incurred kinds of public damages. Thus, it is the current tendency to dispose of the refuse by incineration.

It is known that there are three typical refuse disposing methods in existence presently, i.e. disposing the refuse by, (1) the mould type incinerator which, however, has a small capacity; (2) the mixing-incineration method which is attempted to incinerate the refuse directly and thus it is difficult to incinerate refuse which bears a high water content; and (3) the fluid bed-incinerating method which has a better effect and calls for a rather high cost and operating expenditure since it disposes and incinerates the refuse before which it is crushed to be pasty.

It is therefore attempted by the applicant to deal with the difficulties or disadvantages encountered by the prior art.

SUMMARY OF THE INVENTION

It is therefore an object of the present invention to provide a refuse disposing method and the apparatus thereof having a low cost and operating expenditure.

It is therefore another object of the present invention to provide a refuse disposing method and the apparatus thereof capable of quick incineration.

It is further an object of the present invention to provide a refuse disposing method and the apparatus thereof bearing an optimized refuse disposing design having interrelated elements.

It is yet an object of the present invention to provide a refuse disposing method and the apparatus thereof resulting in no public damage.

It is an additional object of the present invention to provide a refuse disposing method and the apparatus thereof capable of forming a fertilizer.

According to the present invention, a refuse disposing method includes the steps of (a) gathering the refuse at a first place; (b) spreading the refuse from the place; (c) magnetically stripping ferruginous materials from the refuse at step (b); (m) burning the refuse at a combustion chamber with the refuse acting as fuels and (l) preheating the refuse before which is in the combustion chamber by the heat generated in the combustion chamber.

Preferably, the method further includes a step (k) of drying the refuse at a second place by the heat generated in the combustion chamber before the refuse is treated in step (l).

Preferably the method further includes a step (f) of crushing the refuse before the step (k).

Preferably the method further includes a step (h) of dewatering the refuse between the steps (f) and (k).

Preferably the method further includes a step (g) of folding the refuse between the steps (f) and (h).

Preferably the method further includes a step (d) of sawing the refuse into smaller ones between the steps (c) and (f).

Preferably the method further includes a step (i) of resawing and shearing the refuse into smaller ones between the steps (h) and (k).

Preferably the method further includes a step (j) of evenly distributed the refuse into the second place between the steps (i) and (k).

Preferably the method further includes a step (e) of magnetically re-stripping ferruginous materials contained in the refuse between the steps (d) and (f).

Preferably the method further includes a step (n) of oxidizing the difficult-to-oxidize residue in the refuse after step (m) at a plurality of ash cars.

Preferably the method further includes a step (o) of water-scrubbing a flue gas obtained from the second place.

Preferably the method further includes a step (p) of preparing a fertilizer by mixing together a water after used in step (o) and an ash obtained from the ash cars.

According to the present invention, an apparatus for refuse disposing includes a refuse gathering means for gathering therein a refuse, a refuse spreading means for spreading the refuse from the gathering means, a refuse magnetically stripping means for stripping ferruginous materials from the refuse from the spreading means, a refuse burning means for burning the refuse and a preheating means for preheating the refuse from the refuse magnetically stripping means before the refuse is to be burned.

Certainly, the refuse gathering means can be a hopper for receiving therein a refuse.

Certainly, the refuse spreading means can include a first tearing drum horizontally mounted beneath the gathering means and rotating in a first direction, a second tearing drum juxtaposed beside the first tearing drum and rotating in a second direction opposite to the first direction, the second and first tearing drums having a center-to-center distance larger than the sum of the radii thereof by an amount of G, a plurality of L-shaped pieces having the vertical portions thereof respectively and perpendicularly attached to the peripheral surfaces of the tearing drums so that the tearing drums can receive the refuse from the gathering means and tear the refuse therebetween by the L-shaped pieces, a first releasing drum having a diameter smaller than each of those of the first and second tearing drums, mounted at a place near the lower portion of the first tearing drum and rotating in the second direction, the first releasing and tearing drums having a center-to-center distance larger than the sum of the radii thereof by an amount approximately equal to the G, a second releasing drum having a diameter smaller than each of those of the first and second tearing drums, mounted at a place near the lower portion of the second tearing drum and rotating in the first direction, the second releasing and tearing drums having a center-to-center distance larger than the sum of the radii thereof by an amount approximately equal to the G and a plurality of straight pieces having the length thereof approximately equal to that of the vertical portions and respectively and perpendicularly secured to peripheral surfaces of the first and second releasing drums so that the straight pieces can release the refuse which is attached to the vertical portions.

Certainly, the refuse magnetically stripping means can include a first flat belt conveyor for conveying the refuse after spread, a magnet held above the first flat belt conveyor, a non-magnetic cover covering the magnet, two tubular pieces respectively held above the two sides of the conveyor and each having a longitudinal groove, two cam rods respectively received in the two tubular pieces and each of which has a right-handed thread and a left-handed thread and has an end thereof adapted to be secured thereon a sprocket engaged with a motor actuated chain, two follower pieces, through the longitudinal grooves, respectively engaging with the cam rods so that the follower pieces will move in a first direction when engaging with the right-handed threads on the cam rods when rotated and will move in a second direction opposite to the first direction when engaging with the left-handed threads, two receiving containers held beneath the two ends of the cover and each attached at the top thereof a stopping plate, a scraping plate having two ends thereof respectively secured to the follower pieces and having the top side thereof capable of scraping against the cover for scraping down the ferruginous materials attracted on the cover and a receiving plate, slidably received at the bottom side of the scraping plate, for receiving the ferruginous materials scraped down by the scraping plate so that when the follower pieces move in the first (second) direction to a predetermined position, the receiving plate will be stopped by the stopping plate and slide backwards in the second (first) direction to fall the ferruginous materials into one of the receiving containers.

Certainly, the burning means can include a combustion chamber, a chain grate stoker, mounted in the combustion chamber, for conveying the refuse for being burnt thereon and a steam generator, mounted in the combustion chamber, for generating steam by the heat of the hot gas obtained from the combustion chamber.

Certainly, the preheating means can include a preheating chamber, connected to the combustion chamber, for preheating the refuse before which is to be burnt in the combustion chamber by the heat of the hot gas obtained from the combustion chamber and not used for generating the steam.

Preferably the apparatus further includes a drying means, for drying the refuse before which is preheated in the preheating chamber, which includes a drying chamber having an upper drying chamber connected to the preheating chamber and a lower drying chamber and a grate-like member disposed in the drying chamber for separating the upper and lower drying chambers, carrying the refuse thereon to be dried by the hot gas after which is used to generate the steam and preheat the refuse and having a plurality of openings for passing the hot gas from the upper drying chamber into the lower drying chamber.

Preferably the apparatus further includes a water-scrubbing means for water-scrubbing the exhaust gas in the lower drying chamber, since it is very dirty and dusty and contains therein particles of not-combusted refuse.

Certainly, the water-scrubbing means can include a dust scrubber for separating the dust contained in the exhaust gas by meeting the exhaust gas with a water, a disturbing room for further mixing the hot gas with the water coming from the dust scrubber and separating the hot gas from the water, a dust collector for passing the hot gas and retaining thereon the dust in and the water beads formed in the hot gas coming from the disturbing room and a water strainer for retaining thereon the water particles in the hot gas coming through the dust collecter.

Certainly, the dust scrubber can include at least one set of tubes which is externally water-pressurized and includes a plurality of tubes each of which includes a plurality of through holes which are distributed along a threadlike path on the external surface of each tube and each of the holes has an axis parallel to one of the diameter of the each tube with the distance therebetween ranged from about 0.25R to about 0.75R wherein R is the raidus of the each tube.

Preferably the apparatus further includes a crushing means for crushing the refuse before which is to be dried in the drying means.

Certainly, the crushing means can include a first crushing drum provided in a horizontal position, a second crushing drum juxtaposed with the first crushing drum with a center-to-center distance therebetween for crushing and passing the refuse larger than the sum of the radii thereof by an amount G1 which is smaller than the G, a first flywheel attached to the second crushing drum for adding thereto the rotating moment inertia thereof, a third crushing drum provided in a horizontal position, a fourth crushing frum juxtaposed with the third crushing drum with a center-to-center distance therebetween for crushing and passing the refuse after crushed by the first and second crushing drums larger than the sum of the radii thereof by an amount G2 smaller than the G1 and a second flywheel attached to the third crushing drum for adding thereto the rotating moment inertia thereof.

Preferably the apparatus further includes a folding means for folding the refuse after crushed by the crushing means.

Certainly, the folding means can be a casing which includes a first open end having a depth and a width capable of receiving the refuse after crushed by the crushing means, a transition intermediate connected to the first open end and capable of folding the refuse into a plurality of plies having a width correspondingly reduced and a second open end having a width approximately equal to each of those of said plies and a depth approximately equal to the sum of those of the a plurality of plies of the refuse.

Preferably the apparatus further includes a dewatering means for dewatering the refuse after folded by the folding means.

Certainly, the dewatering means can include a plurality of plates tandem disposed to constitute a conveying loop having a conveying speed S for conveying the refuse coming from the folding means and each having a plurality of holes thereon for passing therefrom the water contained in the refuse, two side baffles, respectively attached to the two sides of the plates, for preventing the refuse from expanding sidewards on the plates, a first pair of dewatering drums separated by the conveying loop, having a center-to-center distance larger than the sum of the radii thereof by an amount of G4 smaller than the thickness of the a plurality of plies of the refuse, for passing therebetween the refuse being conveyed by the conveying loop to dewater the water contained in the refuse and having a peripheral speed equal to the S, a second pair of dewatering drums separated by the conveying loop, having a center-to-center distance larger than the sum of the radii thereof by an amount of G5 smaller than the G4, for passing therebetween the refuse being conveyed by the conveying loop dewatered by the first pair of dewatering drums to further dewater the water contained in the refuse, and having a peripheral speed equal to the S and a third pair of dewatering drums separated by the conveying loop, having a center-to-center distance larger tha the sum of the radii thereof by an amount of G6 smaller than the G5, for passing therebetween the refuse being conveyed by the conveying loop after dewatered by the second pair of dewatering drums to dewater the water contained in the refuse again, and having a peripheral speed equal to the S.

Alternatively, the dewatering means can include an endless belt acting as a conveying loop for conveying the refuse coming from the folding means, a pair of upper baffles, respectively secured at the top of the two sides of the endless belt, for preventing the refuse from expanding sidewards on the endless belt, a lower pair of baffles respectively secured at the bottom of the two sides of the endless belt and cooperating with the upper pair of baffles to form therebetween two grooves respectively receiving therein the two sides of the endless belt and a first pair of dewatering drums, a second pair of dewatering drums and a third pair of dewatering drums as described in the above paragraph.

Preferably the apparatus further includes a sawing means for sawing the refuse into smaller ones after stripped by the refuse magnetically stripping means.

Certainly, the sawing means can include a first shaft adapted to be driven by a motor, a first drum coaxially secured to the first shaft for passing the refuse thereon and having a plurality of circular grooves spacedly distributed along the axis thereof, a second shaft adapted to be driven by a motor and a second drum coaxially secured to the second shaft and having a plurality of circular sawing tools which are spacedly distributed along the axis thereof and protrude in the grooves respectively for cooperating with the first drum to saw the refuse into smaller ones.

Preferably the apparatus further includes a refuse resawing means and a shearing means for re-sawing and shearing the refuse into further smaller ones after dewatered by the dewatering means.

Certainly, the re-sawing means can have the structure as that of the sawing means for re-sawing the refuse after being dewatered. The shearing means can include a lower shearing tool, an upper shearing tool capable of cooperating with the lower shearing tool to shear the refuse after being re-sawed by the re-sawing means, a pressing plate springly attached to the upper shearing tool for pressing the refuse against the lower shearing tool when the upper shearing tool is to cooperate with the lower shearing tool to shear the refuse, a hydraulic cylinder having a plunger capable of being in a first position when the upper and lower shearing tools cooperate to shear the refuse and in a second position when the upper shearing tool separates from the lower shearing tool and a cushioning conveying mechanism, having a first end pivotally fixed at a position near the lower shearing tool and a second end connected to the plunger, for conveying the refuse after re-sawn by the re-sawing means to be sheared by the shearing means wherein the differential amount of the refuse between the re-sawing means and the shearing means when the plunger is in the first and second positions respectively is that which will be sheared by the upper and lower shearing tools at a time.

Preferably the apparatus further includes a distributing means for evenly distributing the refuse before the refuse is to be dried in the drying means.

Certainly, the distributing means can include an inclined distributing trough having the top thereof pivotally fixed beneath the bottom of the lower shearing tool for receiving therefrom the refuse after shorn and having a longitudinal groove at the bottom side of the upper portion thereof, a rotating disk adapted to be driven by a motor and a pin secured to the rotating disk and capable of engaging in the longitudinal groove so that when the rotating disk rotates the lower end of the distributing trough will oscillate within a particular range.

Preferably the apparatus further includes a refuse magnetically re-stripping means for magnetically re-stripping ferruginous materials contained in the refuse after sawn by the sawing means.

Certainly, the refuse magnetically re-stripping means can include a flat belt conveyor for conveying the refuse after sawn, a magnet held above the flat belt conveyor and a non-magnetic cover, two tubular pieces, two cam rods, two follower pieces, two receiving containers, a scraping plate and a receiving plate as those described in the refuse magnetically stripping means.

Preferably the apparatus further includes an oxidizing means for oxidizing the difficult-to-oxidize residue in the refuse after burnt by the burning means.

Certainly, the oxidizing means can be a plurality of ash cars each of which is to receive therein the ash and the difficult-to-oxidize residue coming from the burning means, is a container having an open top and includes a bottom frame having a front piece, a rear piece, and two axles mounted thereon wheels, a bottom plate having a front end pivotally connected to the container near the front piece and a rear end and a retaining piece springly connected to the container near the rear piece such that when the retaining piece is externally applied a force the rear end is capable of being released by the retaining piece and thus the rear end will fall down to unload the ash contained in the container, and when the bottom plate is externally applied a force to upwardly urge against the retaining piece the rear end is capable rubbing against and through the retaining piece to be retained thereon when the externally applied force is removed.

Preferably the apparatus further includes a pair of inclined ash car-progressing rails having a first end and a second end and having a length capable of carrying thereon the a plurality of ash cars, a pair of horizontal rails havig a third end connected to the second end and a fourth end connected to a stopping frame, and being lower than the first end, a conveyor secured at the middle portion of the inclined ash car-progressing rails and spacedly attached thereon a plurality of pulling pieces each of which is capable of engaging with the bottom frame to pull forward the respective ash car when which is fully loaded with the ash and the difficult-to-oxidize residue, a pair of inclined ash car-returning rails juxtaposed with the inclined ash car-progressing rails and having a fifth end and a sixth end, a pair of crossover rails having a seventh end connected to the horizontal rails and a eighth end connected to the sixth end, a transferring truck capable of carrying thereon the ash car to be ash-unloaded coming from the first end and a pair of transferring rails for transporting thereon the transferring truck from where adjacent to the first end to where adjacent to the fifth end for releasing the ash car to the fifth end so that the ash car is capable of descending from the inclined ash car-returning rails, through the horizontal rails, to return to the inclined ash car-progressing rails.

Preferably the apparatus further includes a filthy water-treating means for treating the filthy water coming from the dewatering means and the water-scrubbing means.

Preferably the apparatus further includes a fertilizer preparer for preparing a fertilizer constituted by the water coming from the filthy water-treating means and the ash coming from the burning means and the oxidizing means.

The present invention will become apparent by the description of a preferred embodiment of the present invention with reference to the accompanying drawings, in which:

BRIEF DESCRIPTION OF THE DRAWING

FIG. 3 shows a gathering means and a spreading means of a refuse disposing apparatus of the present invention;

FIG. 3A shows a detailed view of a pair of tearing drums and a pair of releasing drums of a spreading means of a refuse disposing apparatus of the present invention;

FIG. 4 shows a refuse magnetically stripping means of a refuse disposing apparatus according to the present invention;

FIG. 4A is an end view showing a refuse magnetically stripping means of a refuse disposing apparatus according to the present invention;

FIG. 4B is a detailed view showing the relationship among a tubular piece, a cam rod and a follower piece of a refuse magnetically stripping means of a refuse disposing apparatus of the present invention;

FIG. 5 shows a sawing means and a refuse magnetically restripping means of a refuse disposing apparatus of the present invention;

FIG. 5A shows a structure of a sawing means of a refuse disposing apparatus of the present invention;

FIG. 7 shows a dewatering means of a refuse disposing apparatus according to the present invention;

FIG. 7A shows a structure of a dewatering means of a refuse disposing apparatus of the present invention;

FIG. 7B shows a plan view showing a plurality of plates of a dewatering means of a refuse disposing apparatus of the present invention;

FIG. 7C shows further a structure of a dewatering means of a refuse disposing apparatus according to the present invention;

FIG. 8 shows a re-sawing means and a shearing means of a refuse disposing apparatus of the present invention;

FIG. 9 shows an end view of a distributing of a refuse disposing apparatus of the present invention;

FIG. 9A shows a front view of a distributing means of a refuse disposing apparatus according to the present invention;

FIG. 14 is a plan view showing the disposition of a pair of inclined ash car-progressing rails, a pair of crossover rails and a pair of inclined ash car-returning rails for an ash car of an oxidizing means of a refuse disposing apparatus of the present invention;

FIG. 14A shows a side view of a pair of inclined ash car-progressing rails and a pair of horizontal rails for an ash car of an oxidizing means of a refuse disposing apparatus of the present invention;

FIG. 14B is a side view of a pair of inclined ash car-returning rails for an ash car of an oxidizing means of a refuse disposing apparatus of the present invention;

FIG. 16 shows a relationship between a transferring truck as well as a pair of transferring rails and a pair of inclined ash car-progressing rails, a pair of crossover rails as well as a pair of inclined ash car-returning rails for an ash car of an oxidizing means of a refuse disposing apparatus of the present invention;

FIG. 16A is a schematic side view showing an ash car, a transferring truck and a pair of transferring rails of a refuse disposing apparatus of the present invention;

FIG. 16B is a plan view showing a hydraulic cylinder capable of being used in gripping an ash car for an oxidizing means of a refuse disposing apparatus of the present invention;

DETAILED DESCRIPTION OF THE PREFERRED EMBODIMENT

Figure 1:
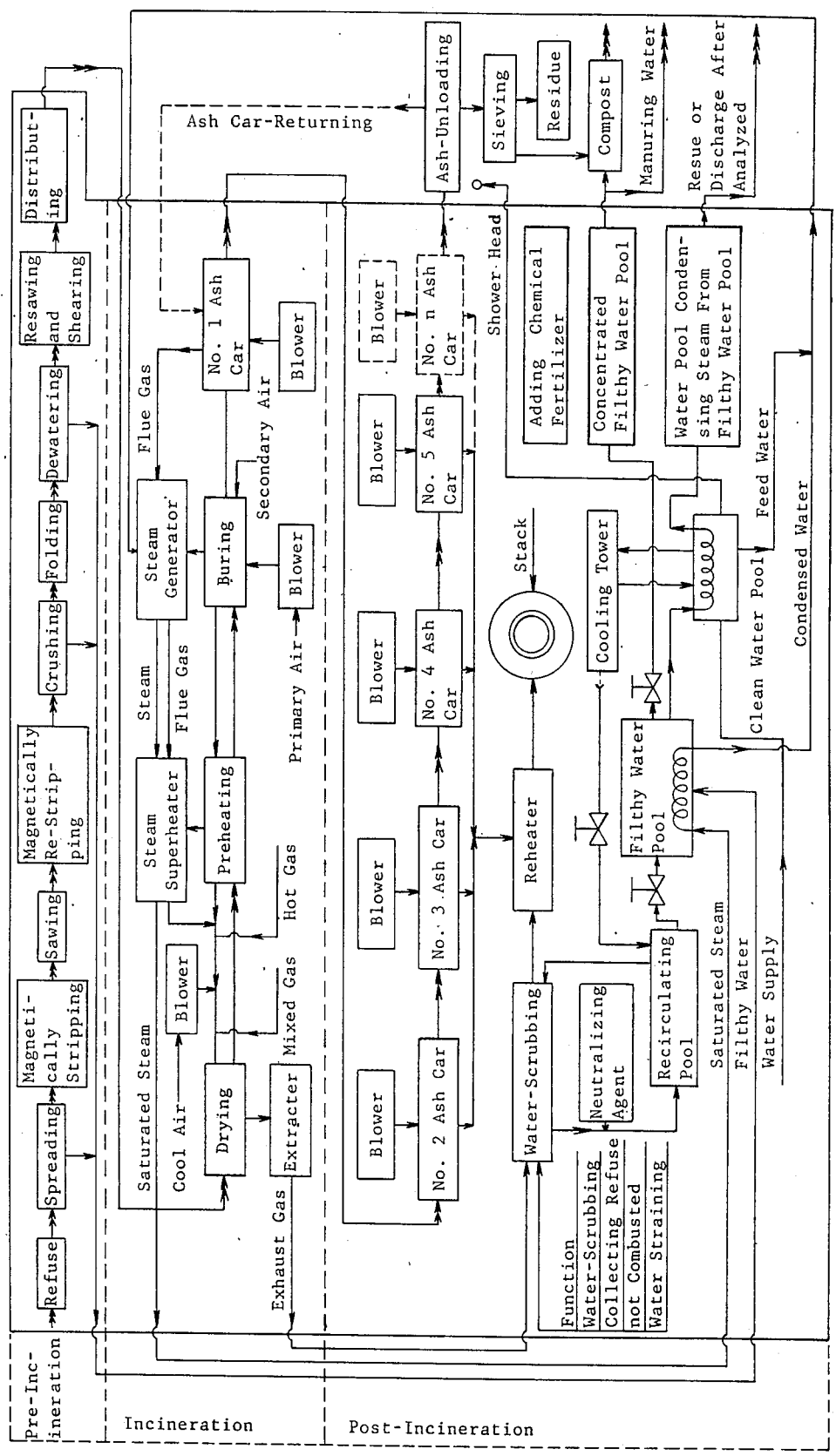
FIG. 1 is a flow chart showing a preferred embodiment of a refuse disposing method of the present invention.

Referring now to FIG. 1, there is shown a refuse disposing method according to the present invention which can be broadly categorized into three procedures, namely, (1) the pre-incineration disposal which can include the steps of refuse gathering, spreading, magnetically stripping, sawing, magnetically re-stripping, crushing, folding, dewatering, re-sawing and shearing and distributing; (2) the incineration which broadly includes the steps of refuse drying, preheating and burning; and (3) the post-incineration disposal which broadly includes the steps of water-scrubbing the hot gas obtained from the refuse drying step, filthy water-treating and fertilizer preparing, and the details of which will be described hereinafter.

Figure 2:
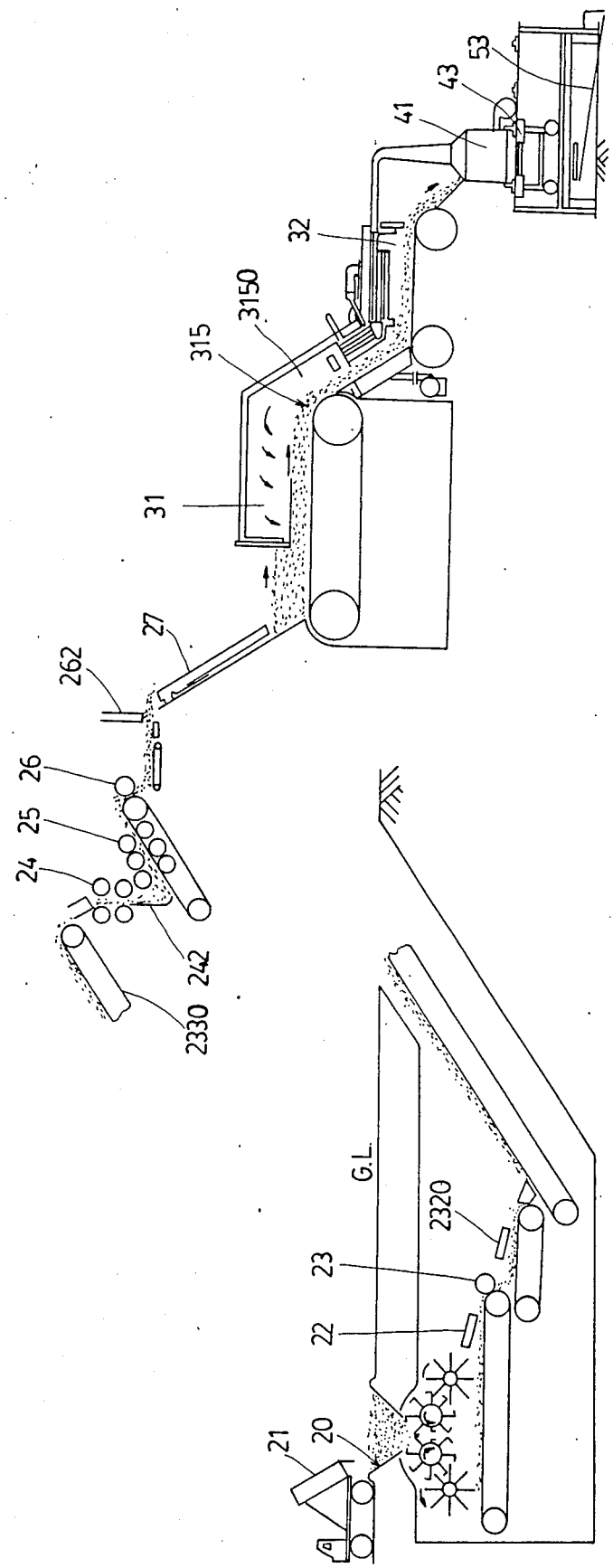
FIG. 2 is a schematic structural view showing a preferred embodiment of a refuse disposing apparatus of the present invention.

FIG. 2 shows a schematic structural view of a refuse disposing apparatus according to the present invention which can broadly include a refuse gathering means 20, a refuse spreading means 21, a refuse magnetically stripping means 22, a refuse sawing means 23, a refuse magnetically re-stripping means 2320, a refuse crushing means 24, a refuse folding means 242, a refuse dewatering means 25, a refuse re-sawing means 26 and a refuse shearing means 262, a refuse distributing means 27, a refuse drying means 31, a refuse preheating means 315, a refuse burning means 32, a refuse oxidizing means 41, an ash unloading means 43 and an ash collector 53, and the details of which will be described hereinafter.

The contents of the refuse bear many a variety which include those which are highly combustible, e.g. the paper, the oiled rag . . . etc., those which have not a good combustibility, e.g. the rotton fruit, the animal bodies . . . etc. and those which cannot be burnt, e.g. the nut, the empty can . . . etc. The average water content of the refuse is not constant and ranges from about 30% to about 80%. Thus, careful and deliberative disposing steps should be rendered in order that the refuse can be effectively and fully incinerated soon.

In disposing the refuse by incineration in accordance with a preferred embodiment of the present invention, four chapters respectively describing the procedures of (1) pre-incineration disposal; (2) incineration; (3) post-incineration disposal; and (4) the disposal of exhaust gas, filthy water and ash are introduced.

CHAPTER 1—PRE-INCINERATION DISPOSAL

It is preferable that the refuse is not pasty before which is to be crushed. The pre-incineration disposal can include the steps of refuse gathering, spreading, magnetically stripping, sawing, magnetically re-stripping, crushing, folding, dewatering, re-sawing, shearing and distributing. The respective means are respectively described in the following sections. It is possible to mount the refuse gathering means, the refuse spreading means, the refuse magnetically stripping means, the refuse sawing means and the refuse magnetically re-stripping means underground.

SECTION 1—THE GATHERING AND SPREADING MEANS

As shown in FIG. 3, a refuse gathering truck 2101 dumps the refuse into a refuse gathering means 20 capable of being a hopper 2102 from where a refuse spreading means 21 can receive the refuse for spreading thereon. Concurrently referring to FIG. 3A, spreading means 21 includes a first tearing drum 2103 horizontally mounted beneath hopper 2102 and rotating in a first direction, a second tearing drum 2104 juxtaposed beside first tearing drum 2103 to have a center-to-center distance therebetween larger than the sum of the radii thereof by an amount of G and rotating in a second direction opposite to the first direction, a plurality of L-shaped pieces 2105 having the vertical portions thereof 21050 respectively and perpendicularly attached to the peripheral surfaces of tearing drums 2103 and 2104 so that tearing drums 2103 and 2104 can receive the refuse from hopper 2102 and tear the refuse therebetween by L-shaped pieces 2105, a first releasing drum 2106 having a diameter smaller than each of those of tearing drums 2103 and 2104, mounted at a place near the lower portion of first tearing drum 2103 to have a center-to-center distance therebetween larger than the sum of the radii thereof by an amount approximately equal to the G and rotating in the second direction, a second releasing drum 2107 having a diameter smaller than each of those of tearing drums 2103 and 2104, mounted at a place near the lower portion of second tearing drum 2104 to have a center-to-center distance therebetween larger than the sum of the radii thereof by an amount approximately equal to the G and rotating in the first direction and a plurality of straight pieces 2108 having the length thereof approximately equal to that of vertical portions 21050 and respectively and perpendicularly secured to the peripheral surfaces of releasing drums 2106 and 2107 so that straight pieces 2108 can release the refuse which is attached to vertical portions 21050. The volume of hopper 2102 is determined by the quantity of the refuse to be disposed by the present invention. The longitudinal and transverse pitches of L-shaped pieces 2105 and straight pieces 2108 are to be determined by the nature of the refuse to be disposed, so is the G. The refuse after torn by spreading means 21 will become loose and are conveyed by a first flat belt conveyor 2110 fixed at a position beneath spreading means 21 for being stripped the ferruginous materials contained therein by a refuse magnetically stripping means 22. Certainly, if desired, the conveyor 2110 can be provided with sides for preventing the refuse from falling sidewards.

SECTION 2—THE REFUSE MAGNETICALLY STRIPPING MEANS

As shown in FIGS. 4-4B, refuse magnetically stripping means includes a magnet 2201 held above first flat belt conveyor 2210, a non-magnetic protecting cover 2202 covering magnet 2201, two tubular pieces 2206 respectively held above the two sides of conveyor 2210 and each having a longitudinal groove 22060, two cam rods 2205 respectively received in tubular pieces 2206 and each of which has a right-handed thread and a left-handed thread and has an end thereof adapted to be secured thereon a sprocket 2207 engaged with a motor actuated chain (not shown), two follower pieces 2204, through longitudinal grooves 22060, respectively engaging with cam rods 2205 so that follower pieces 2204 will move in a first direction when engaging with the right-handed threads on cam rods 2205 when rotated and will move in a second direction opposite to the first direction when engaging with the left-handed threads on cam rods 2205, two receiving containers 2211 held beneath the two ends of cover 2202 and each attached at the top thereof a stopping plate 2210, a scraping plate 2203 having two ends thereof respectively secured to follower pieces 2204 and having the top side thereof capable of scraping against cover 2202 for scraping down the ferruginous materials attracted on cover 2202 and a receiving plate 2208, slidably received at the bottom side of scraping plate 2203, for receiving the ferruginous materials scraped down by scraping plate 2203 so that when follower pieces 2204 move in the first (second) direction to a predetermined position, receiving plate 2208 will be stopped by stopping plate 2210 and slide backwards in the second (first) direction to fall the ferruginous materials into one of receiving containers 2211 which are guided to fall the ferruginous materials into a collecting casing 2212 which is guided to fall the ferruginuous materials into a collecting container 2213. Several pieces of supports 2209 can be used to support the respective elements described above as shown.

SECTION 3—THE REFUSE SAWING AND MAGNETICALLY RE-STRIPPING MEANS

The refuse after spread and magnetically stripped still possibly contains therein large pieces of refuse and hides therein ferruginous materials both of which need be sawn into smaller ones or magnetically re-stripped.

As shown in FIGS. 5 and 5A, a sawing means 23 according to the present invention includes a first shaft 2303 adapted to be driven by a motor, a first drum 2301 coaxially secured to first shaft 2303 for passing the refuse thereon and having a plurality of circular grooves 23010 spacedly distributed along the axis thereof, a second shaft 2306 adapted to be driven by a motor and a second drum 2305 coaxially secured to second shaft 2306 and having a plurality of circular sawing tools 2304 which are spacedly distributed along the axis thereof and protrude in grooves 23010 respectively for cooperating with first drum 2301 to saw the refuse into smaller ones. Between first drum 2301 and conveyor 2110, a guiding piece 2302 is provided for guiding the refuse through a space 23020 therebetween. Drums 2301-2305 can be mounted at an angle $\theta$ with respect to a horizontal line and, also, drum 2301 is rotating so that hard or heavy pieces in the refuse will pass through sawing means 23 by most possibly passing through every adjacent two sawing tools 2304 without damaging tools 2304. The refuse after sawn is conveyed by a conveyor 2310 to be magnetically re-stripped the ferruginous materials contained therein by magnetically re-stripping means 2320 which may have a structure as that of magnetically stripping means 22. The refuse after magnetically re-stripped passing through a hollow intermediate 2311 having a first end receiving the refuse from conveyor 2310 and a second end releasing the refuse to a troughlike belt conveyor 2330 is conveyed by conveyor 2330 to be crushed.

SECTION 4—THE CRUSHING AND FOLDING MEANS

The spread refuse need be fully crushed for being dewatered easily.

Figure 6:
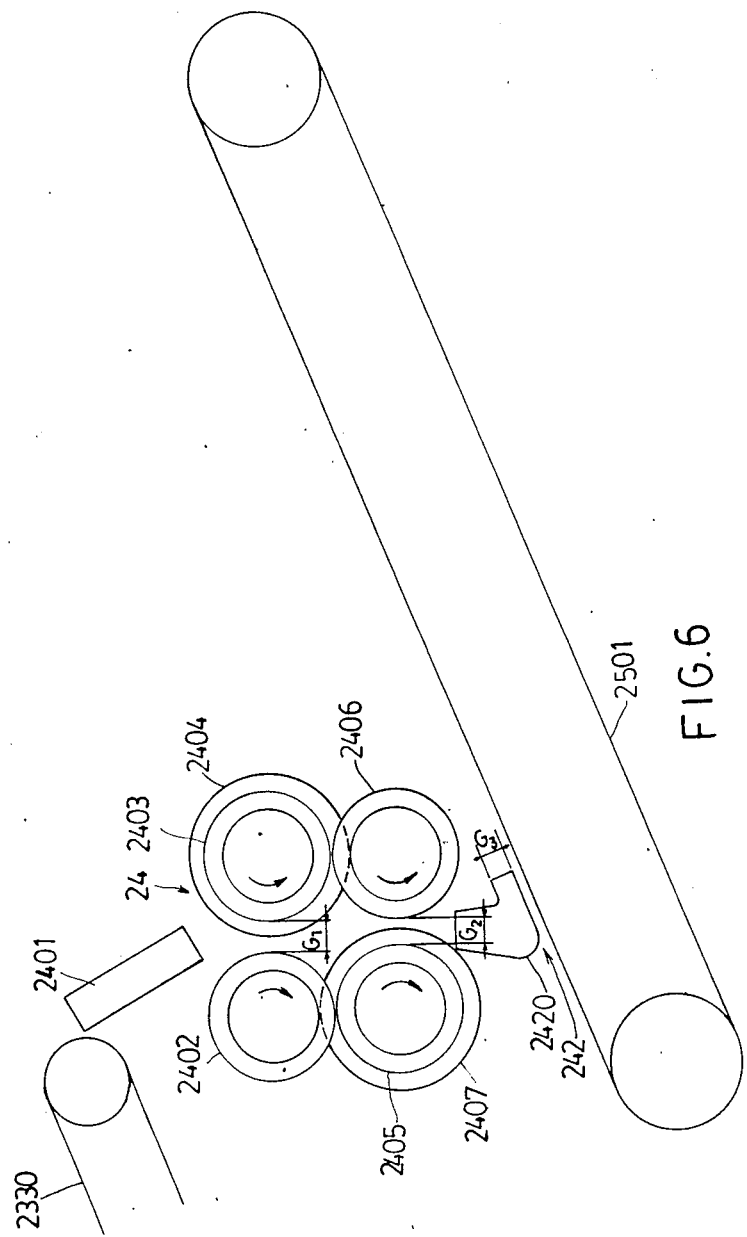
FIG. 6 is a schematic view showing a crushing means of a refuse disposing apparatus of the present invention.
Figure 10A:
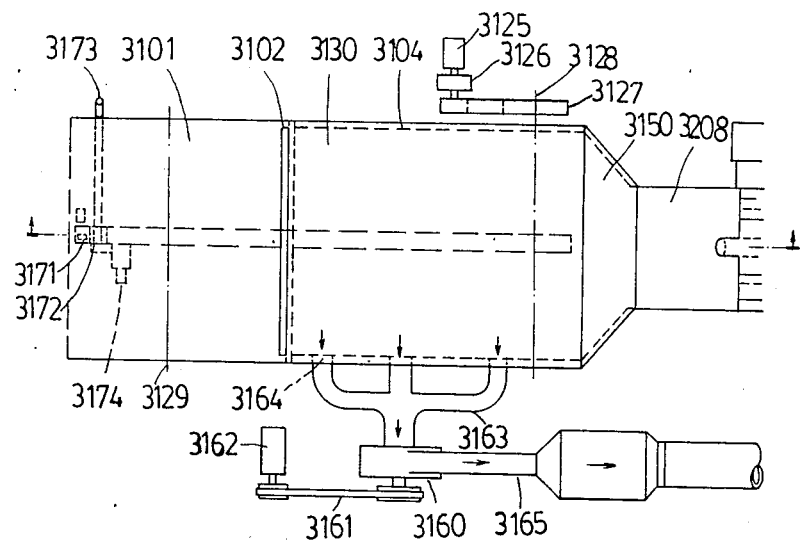
FIG. 10A is a top view of a drying means of a refuse disposing apparatus of the present invention.
Figure 10:
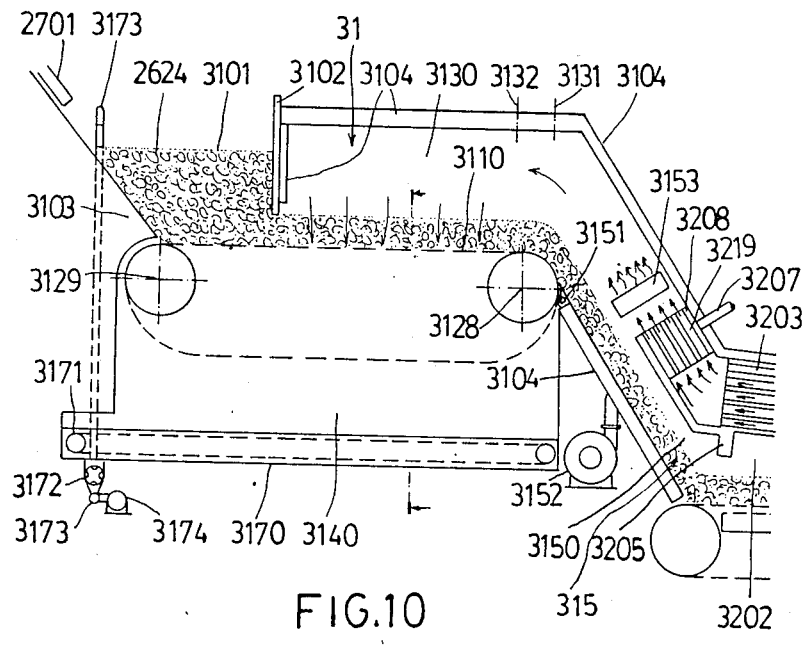
FIG. 10 is a preferred embodiment of a drying means of a refuse disposing apparatus of the present invention.
Figure 10B:
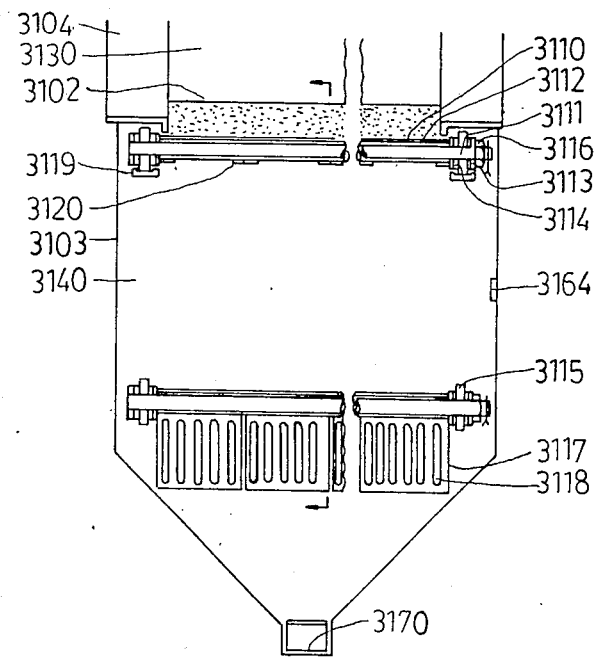
FIG. 10B is a transverse view showing a drying means of a refuse disposing apparatus according to the present invention.
Figure 10C:
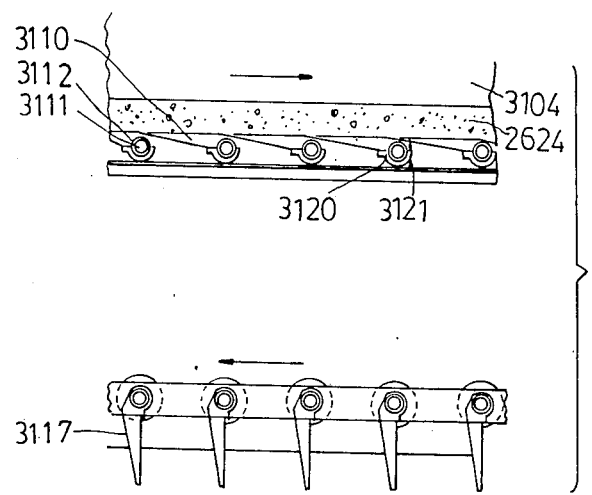
FIG. 10C is a longitudinal view showing a chain grate stoker of a drying means of a refuse disposing apparatus of the present invention.

As shown in FIG. 6, a crushing means 24 according to the present invention can include a first crushing drum 2402 provided in a horizontal position, a second crushing drum 2403 juxtaposed with first crushing drum 2302 with a center-to-center distance therebetween for crushing and passing the refuse released by a hollow intermediate 2401 receiving the refuse from conveyor 2330 larger than the sum of the radii thereof by an amount G1 smaller than the G, a flywheel 2404 attached to second crushing drum 2403 for adding thereto the rotating moment inertia thereof, a third crushing drum 2405 provided in a horizontal position, a fourth crushing drum 2406 juxtaposed with third crushing drum 2405 with a center-to-center distance therebetween for crushing and passing the refuse after crushed by first and second crushing drums 2402 and 2403 larger than the sum of the radii thereof by an amount G2 smaller than the G1 and a second flywheel 2407 attached to third crushing drum 2405 for adding thereto the rotating moment inertia thereof.

A folding means 242 according to the present invention can be a casing 2420 which includes a first open end having a depth and a width capable of receiving the refuse after crushed by crushing means 24, a transition intermediate connected to the first open end and capable of folding the refuse into a plurality of plies each of which has a width correspondingly reduced and a second end having a width approximately equal to each of those of the refuse plies and a depth G3 approximately equal to the sum of those of the refuse plies.

Certainly, the peripheral surfaces of crushing drums 2402, 2403, 2405, 2406 can be indented to assist the refuse passing through folding means 242.

The refuse after folded is conveyed by a conveyor 2501 to be dewatered.

SECTION 5—THE DEWATERING MEANS

For being incinerated easily, the refuse need be dewatered. In addition, the refuse after crushed and dewatered, its water content will more be uniformed.

As shown in FIGS. 7, 7A and 7B, a dewatering means according to present invention can include a plurality of plates 2507 tandem disposed to constitute a conveying loop having a conveying speed S for conveying the refuse coming from folding means 242 and each having a plurality of holes 2510 thereon for passing therefrom the water contained in the refuse two side baffles 2508, respectively attached to the two sides of plates 2507, for preventing the refuse on plates 2507 from expanding sidewards, a first pair of dewatering drums 2511, 2512 separated by the conveying loop, having a center-to-center distance larger than the sum of the radii thereof by an amount of G4 smaller than the thickness of the refuse plies from folding means 242, for passing therebetween the refuse being conveyed by the conveying loop to dewater the water contained in the refuse, and having a peripheral speed equal to the S, a second pair of dewatering drums 2513, 2514 separated by the conveying loop, having a center-to-center distance larger than the sum of the radii thereof by an amount of G5 smaller than the G4, for passing therebetween the refuse after dewatered by dewatering drums 2511, 2512 to further dewater the water contained in the refuse, and having a peripheral speed equal to the S and a third pair of dewatering drums 2515 separated by the conveying loop, 2516, having a center-to-center distance larger than the sum of the radii thereof by an amount of G6 smaller than the G5, for passing therebetween the refuse after dewatered by dewatering drums 2513, 2514 to dewater the water contained in the refuse again, and having a peripheral speed equal to the S.

In addition to dewatering the refuse, dewatering drums 2511–2516 are to make the refuse have a uniformed water content. Thus, if the water content of the refuse still is not enough uniformed, the pairs of the dewatering drums can be increased or the dewatering drums can be replaced by the sheepsfoot rollers.

The refuse disposed by this and the previous sections will have the water contained in the refuse enriched with the water content absorbed by the refuse having a little or poor water content and have the redundant water to be collected by respect filthy water receivers which are connected to a filthy water pool in a filthy water-treating means as will be described later.

All shafts of the lower dewatering drums 2511, 2513 and 2515 can be respectively connected to sprockets 2519 upon which a chain 2518 is engaging which is engaging with a motor actuated sprocket 2517. Two idle rollers 2520 engage with chain 2518 as shown for securing a reliable transmission between sprockets 2517 and 2519. The same situation can happen to upper dewatering drums 2512, 2514 and 2516. Further, it is preferable to mount a spring between each pair of the dewatering drums to seek a constant pressure therebetween.

Each plates 2507 can fix at the bottom thereof a pair of outer check plates 2504, a pair of inner check plates 2506 and a pair of rollers 2505 all of which engage with a pair of rails 2503 secured at a securing frame 2502. A pair of screws 2509 can fasten together baffles 2508, the two ends of plates 2507 and outer check plates 2504 respectively as shown.

Alternatively, as shown in FIG. 7C, dewatering means 25 can include an endless belt 2530 for conveying the refuse coming from folding means 242, a pair of upper baffles 2531, respectively secured at the bottom of the two sides of endless belt 2530, for preventing the refuse from expanding sidewards on endless belt 2530, a lower pair of baffles 2532 respectively secured at the bottom of the two sides of endless belt 2530 and cooperating with upper pair of baffles to form therebetween two grooves 25330, which are formed by respectively inserting two intermediates 2533 therebetween with each of a pair of screws 2534 fastening an upper baffle 2531, a lower baffle 2532 and an intermediate 2533, respectively receiving therein the two sides of endless belt 2530 and the dewatering drums 2511–2516. With the filthy water squeezed out acting as a lubricant, endless belt 2530 will not encounter a large resistance in moving in grooves 25330. In addition, it is preferable to have the bottom of endless belt 2530 supported by a plurality of idle rollers not shown.

SECTION 6—THE RESAWING AND SHEARING MEANS

The refuse disposed after the above sections will have a higher density and thus is not capable of being easily dried, preheated or burnt. Thus, it need be made into smaller ones.

As shown in FIG. 8, the refuse conveyed by conveyor 2501, through a guiding piece 2602, is to be resawed by a resawing means 26 which can have the structure as that of sawing means 23 to have a first shaft 2603, a first drum 2601, a second shaft 2606, a second drum 2605 and a plurality of circular sawing tools 2604.

A shearing means 262 according to the present invention can include a lower shearing tool 2622, an upper shearing tool 2621 capable to cooperating with lower shearing tool 2622 to shear the refuse after being resawed by resawing means 26, a pressing plate 2623 springly attached to upper shearing tool 2621 for pressing the refuse against lower shearing tool 2622 when upper shearing tool 2621 is to cooperate with lower shearing tool 2622 to shear the refuse, a hydraulic cylinder 2615 having a plunger capable of being in a first position when upper and lower shearing tools 2621 and 2622 cooperate to shear the refuse and in a second position when upper shearing tool 2621 separates from lower shearing tool 2622 and a cushioning conveying mechanism 2610, having a first end pivotally fixed at a position near lower shearing tool 2622 and a second end connected to the plunger, for conveying the refuse after re-sawn to be sheared by shearing means 262 wherein the differential amount of the refuse between resawing means 26 and shearing means 262 when the plunger is in the first and second positions respectively is that which will be sheared by shearing means 262 at a time. A microswitch and a solenoid valve can be incorporated here to implement the relation of hydraulic cylinder 2615 with respect to upper shearing tool 2621.

Cushioning conveying mechanism 2610 can include rollers 2611 having coaxial sprockets 2612 upon which a chain 2613 is engaging powered by a driven shaft 2614 which also acts as a pivotal end of mechanism 2610.

The refuse obtained after disposed by this section can have a length from about 20 cm to about 50 cm and a crosssection area from about 3 square cm to about 5 square cm.

SECTION 7—THE DISTRIBUTING MEANS

Normally, if possible, it is preferable to incinerate the refuse as much as possible. Thus, the drying means should be wider than conveyor 2501. In turn, it is necessary to have a distributing means for distributing the refuse 2624 after resawed and sheared into the drying means.

As shown in FIGS. 9 and 9A, a distributing means 27 according to the present invention includes an inclined distributing trough 2701 having the top thereof pivotally fixed on a pin 2702 secured beneath the bottom of lower shearing tool 2622 for receiving therefrom refuse 2624 and having a longitudinal groove 2707 at the bottom side of the upper portion thereof, a rotating disk 2705 driven, through a reduction gear box 2704, by a motor 2703 and a pin 2706 secured to rotating disk 2705 and capable of engaging in longitudinal groove 2707 so that when rotating disk 2705 rotates the lower end of distributing through 2701 will oscillate within a particular range. Thus, refuse 2624 will be distributed to a storage space 3101 of the drying means uniformly.

CHAPTER 2—INCINERATION

Materials in refuse 2624 have those which have a high calorific power, e.g. the oiled rag, those which have a moderate calorific power, e.g. the bamboo or the household plastic manufacture and those which have a low calorific power, e.g. the paper. Since the household plastic manufacture has a low melting point, in drying refuse 2624 in the drying means, the drying means should be kept at a temperature not higher than the melting point in order not to impede the drying of refuse 2624 which will, otherwise, be enclosed by the molten plastics.

This chapter contains three sections to be described, i.e. (1) the drying and preheating means; (2) the burning means; and (3) the controls of temperature as well as putting off and starting the fire.

SECTION 1—THE DRYING AND PREHEATING MEANS

Considering the melting point of the plastics and the avoidance of the expensive heat-resisting steel, it becomes apparent that it is preferable to dry refuse 2624 at a temperature lower than the melting point of household plastics.

As shown in FIGS. 10 and 10A–10C, a drying means 31 according to the present invention can include a drying chamber having an upper drying chamber 3130, through an adjustable gate 3102, receiving refuse 2624 from storage space 3101 and a lower drying chamber 3140 and a grate-like member disposed in the drying chamber for separating upper drying chamber 3130 from lower drying chamber 3140, carrying refuse 2624 thereon to be dried by the flue gas coming from the preheating and burning means (as will be described later) and having a plurality of openings 3118 for passing the flue gas from upper drying chamber 3130 into lower drying chamber 3140. Grate-like member 3110 can include a plurality of rods 3111, sleeves 3112 coaxially mounting therein rods 3111 respectively, pairs of outer check plates 3113, pairs of inner check plates 3114, pairs of rollers 3115 respectively mounted on rods 3111 and embraced by plates 3114 and 3113, nuts 3115 respectively screwed on rods 3111, sets of grate-like pieces 3117 respectively attached to sleeves 3112 and having openings 3118, sets of grate-like piece clips 3120, sets of screws 3121 fastening together grate-like pieces 3117 and grate-like pieces clips 3120 respectively, and a pair of rails 3119 rotating thereon rollers 3115.

Drying means 31 can have a casing 3103, walls 3104 built of refractory bricks, a temperature gauge 3131 and a vacuum gauge 3132. Grate-like member 3110 is conveyed by a conveying chain engaged with an active sprocket 3128 powered by a transmission sprocket 3127, through a reduction gear box 3126, driven by a variable speed motor 3125.

A preheating means 315 according to the present invention can include a preheating chamber 3150 connected to upper drying chamber 3130 for preheating refuse 2624 before which is to be burnt in the burning means by the heat of the exhaust gas obtained from the burning means and mount at the top wall thereof a steam superheater 3208. The material to be used in the region 3151 between upper drying chamber 3130 and the bottom of preheating chamber 3150 must be heat-resisting and abrasion-resistant since the structure built here must urge against grate-like pieces 3117 in order not to fail refuse 2624 into lower drying chamber 3140. In addition, the structure can be hollow and circulated with cool water to be cooled.

Concurrently referring to FIGS. 11 and 11A referred to the burning means as will be detailedly described later, the exhaust gas coming from the combustion chamber 3202 behind the water wall 3205 of a steam evaporator 3203 built in the burning means will directly pass through preheating chamber 3150 to preheat and dry refuse 2624 again and the flue gas coming from combustion chamber 3202 before water wall 3205 and the hot gas tube 3214 from the No. 1 and No. 2 ash cars 3216 will pass through the fire tubes 3204 of steam evaporator 3203 to generate steam and go ahead to pass through the fire tubes 3219 of steam superheater 3208 to improve the dryness of the steam therein. After passing through steam superheater 3208, the flue gas still bears a high temperature and thus need to be mixed with the cool air coming from the cool air tube 3153 air-supplied by an air blower 3152 to get a hot gas having a lowered temperature for drying refuse 2624 in drying means 31.

Refuse 2624 dried in upper drying chamber 3130 will increase in volume. The hot gas after drying refuse 2624 in upper drying chamber 3130 will pass, through openings 3118, into lower drying chamber 3140 to be extracted, through intakes 3164 of a manifold 3163, by a gas extracter 3160, through a transmission belt 3161, driven by a variable speed motor 3162 to a gas exit tube 3165.

It is possible that refuse 2624 of small size will fall, through openings 3118 and region 3151, down into the bottom of lower drying chamber 3140 which is downwardly convergent. A drag chain conveyor 3170 mounted at the bottom for carrying refuse 2624 thereon to a place, near the active sprocket 3171 thereof, where refuse 2624 falls, through a rotary valve 3172, into a pneumatic conveyor tube 3173 for being sent to storage space 3101 by a gas blower 3174.

SECTION 2—THE BURNING MEANS

Refuse 2624 is now ready to be burnt.

Figure 11A:
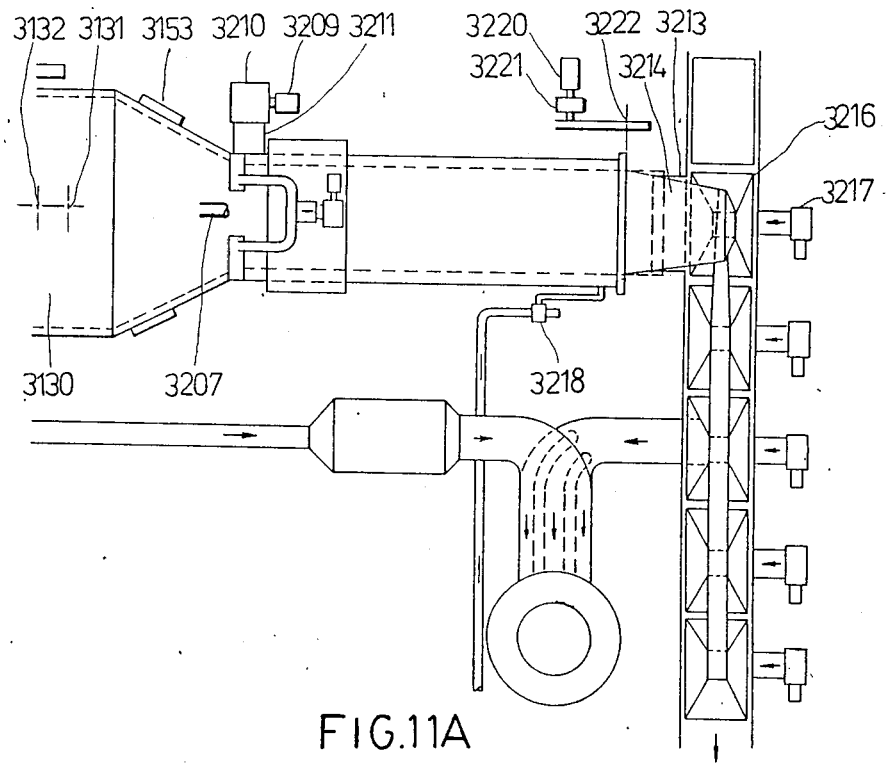
FIG. 11A shows a top view of a preheating means and a burning means of a refuse disposing apparatus of the present invention.
Figure 11:
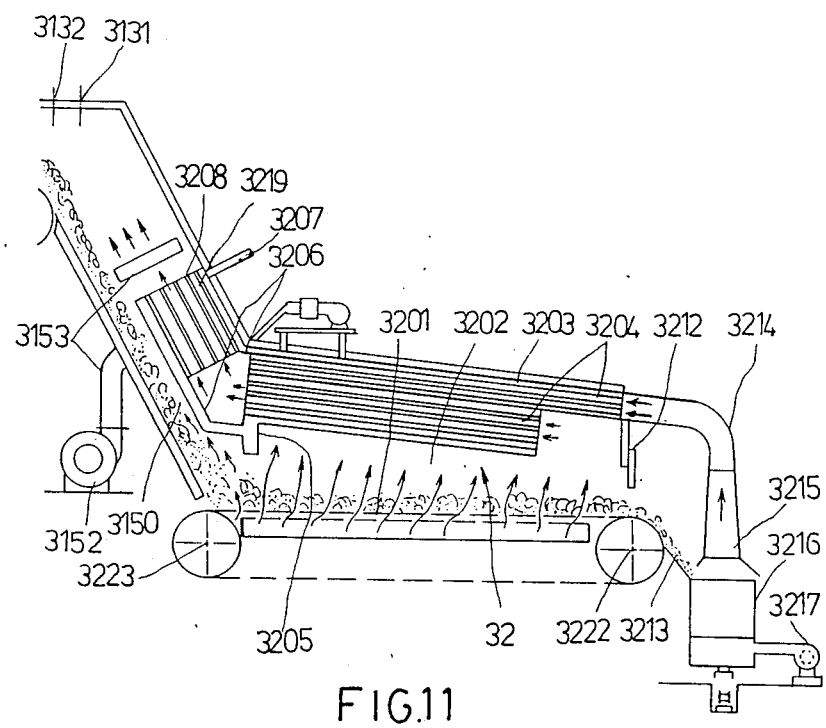
FIG. 11 shows a preferred embodiment of a preheating means and a burning means of a refuse disposing apparatus according to the present invention.

A burning means 32, as shown in FIGS. 11 and 11A, according to the present invention can include combustion chamber 3202, a chain grate stoker 3201 mounted in combustion chamber 3202 for conveying refuse 2624 and steam generator 3203 mounted in combustion chamber 3202 for generating steam by the heat of the flue gas obtained from combustion chamber 3202.

Refuse 2624 in chain grate stoker 3201 will burn with the required air coming from the primary air supplied, through an air tube 3211, by an air blower 3210 powered by a motor 3209 and coming from the secondary air intake 3212. Thus, the thickness of refuse 2624 on chain grate stoker 3201 will become smaller and smaller. Finally, at the rear portion of combustion chamber 3202, refuse 2624 is nearly fully burnt and remains only those which are difficult-to-oxidize and non-combustible, e.g. the meat, the bone . . . etc., which do not have a large amount, will not be oxidized on chain grate stoker 3201 to reduce costs and will fall, through an exit 3213, to the ash car 3216. The exhaust gas in combustion chamber 3202 before water wall 3205 will heat and pass along the steam tube 3205, the outer surface of steam superheater 3208 and refuse 2624 in preheating chamber 3150. The flue gas in combustion chamber 3202 behind water wall 3205 will heat the lower portion of steam generator 3203 and mix with the secondary air to get into fire tubes 3204. The difficult-to-oxidize residue in ash car 3216 will continue to oxidize with the required air coming from a blower 3217. The hot gas thus obtained will, through a casing 3215 and a hot gas tube 3214, get into fire tubes 3204. At the space between steam generator 3203 and steam superheater 3208, the hot gas coming from ash car 3216 and the exhaust gas coming from combustion chamber 3202 behind the water wall 3205 will mix together and enter into hot gas tubes 3219 to improve the dryness of the steam of steam superheater 3208. After passing through fire tubes 3219, the hot gas will mix together with the hot gas coming from combustion chamber 3202 before water wall 3205. The hot gas thus obtained will mix with the cool air to enter into upper drying chamber 3130 as has been described above. When ash car 3216 is fully loaded, a second ash car will replace its position.

The first and second ash cars should be regarded as a portion of combustion chamber 3202 because they are oxidizing the difficult-to-oxidize residue therein. The hot gas resulted by burning the organic materials generally has the odor and can pollute the air if directly discharged to the atmosphere. Thus, it is most preferable to guide the hot gas, through casing 3215, hot gas tube 3214, fire tubes 3204, drying chambers 3130 and 3140 and gas extracter 3160, to be water-scrubbed as will be described later before emitted to the atmosphere.

Chain grate stoker 2301 is conveyed by an active sprocket 3222 which is driven, through a reduction gear box 3221, by a motor 3220 which must be speed-variable in order to set a speed according to the nature of refuse 2624, and rotates the passive sprocket 3223. Passive sprocket 3223 should be connected to a hydraulic cylinder (not shown) for adjusting the space between water wall 3205 and refuse 2624.

The water needed in steam generator 3203 is supplied by a feedwater pump 3218. The superheated steam generated by steam superheater 3208 is conveyed by a steam tube 3207.

SECTION 3—THE CONTROLS OF TEMPERATURE AND PUTTING OFF AND STARTING OF FIRE

Figure 12A:
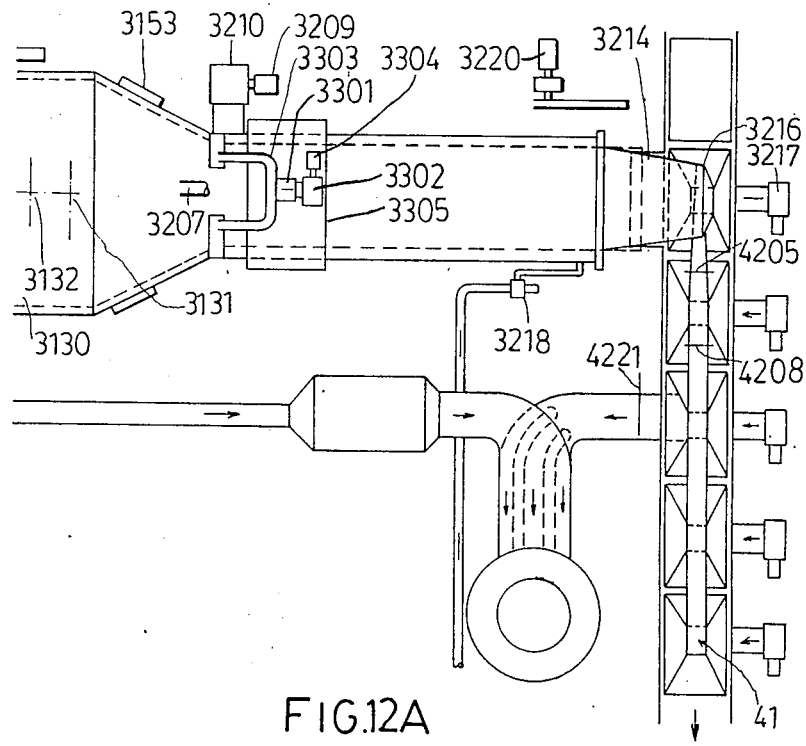
FIG. 12A shows respective elements controlling the temperature, firing up and putting off the fire in a preheating means and a burning means in the top view of a preheating means and a burning means shown in FIG. 11A of a refuse disposing apparatus of the present invention.
Figure 12:
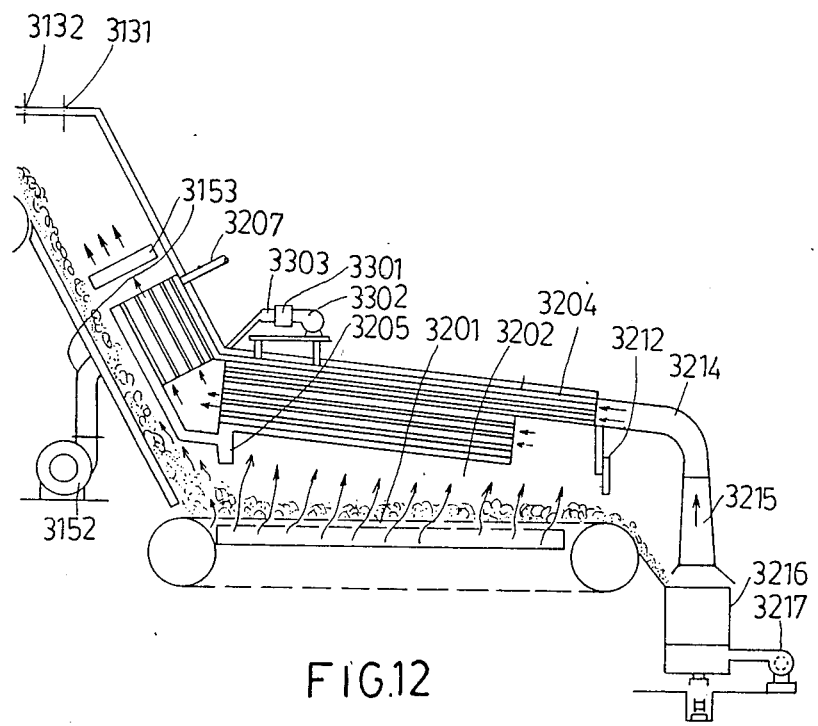
FIG. 12 shows respective elements controlling the temperature, firing up and putting off the fire in the preheating means and the burning means shown in FIG. 11 of a refuse disposing apparatus according to the present invention.
Figure 13:
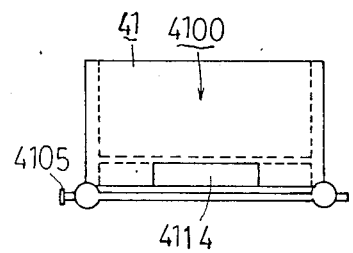
FIG. 13 shows a side view of an ash car of an oxidizing means of a refuse disposing apparatus of the present invention.
Figure 13B:
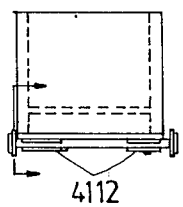
FIG. 13B is a rear end view of an ash car of an oxidizing means of a refuse disposing apparatus of the present invention.
Figure 13A:
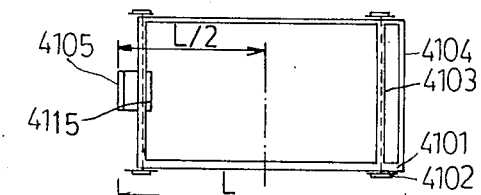
FIG. 13A is a plan view showing a bottom structure of an ash car of an oxidizing means of a refuse disposing apparatus of the present invention.
Figure 13C:
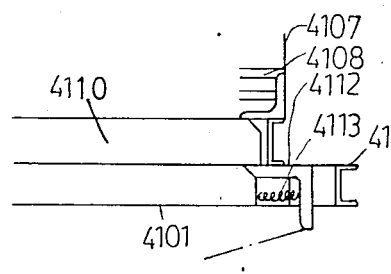
FIG. 13C is a detailed view showing the relationship of a bottom plate and a retaining piece of an ash car of an oxidizing means of a refuse disposing apparatus of the present invention.
Figure 13D:
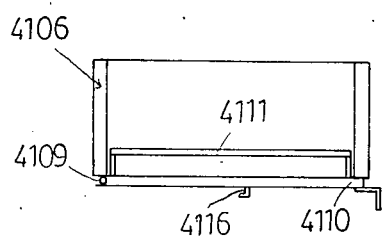
FIG. 13D is a schematic view showing how a bottom plate is engaged with an ash car of an oxidizing means of a refuse disposing apparatus according to the present invention.

The calorific power of refuse is different according to its nature. Thus, the temperature in related means need be controlled in order to secure a smooth operation of the present apparatus. This section will be described with reference to FIGS. 12 and 12A.

If the temperature of combustion chamber 3202 is too high, the flowrate, the temperature and the pressure resulted in steam generator 3202 will increase to possibly incur a danger. Thus, steam exit 3207 should be fitted with a steam flow meter, a temperature gauge and a pressure gauge all of which should be set with respective upper and lower limits. If upper (lower) limit is approached, the speed of motor 3220 should be increased (decreased) to reduce (increase) the time refuse 2624 stays in combustion chamber 3202 and the rotating speed of blower 3217 should be reduced (increased).

Temperatue gauge 3131 should also be set with an upper limit, which, e.g., can be set at a temperature lower than the sum of the melting point of the household plastics and the temperature difference between the measuring point and gauge 3131, and a lower limit which can be set by considering the average water content, the specific heat and the thickness of refuse 2624, the conveyed speed of refuse 2624, the length and width of upper drying chamber 3130 . . . etc. If the upper (lower) limit is approached, the amount of the air from secondary air intake 3212 is increased (decreased). If not enough effective, the speed of blower 3217 is decreased (increased). If still not sufficiently effective, the rotating speed of motor 3152 is increased (decreased) to increase (decrease) the amount of the cool air, through air tube 3153, supplied to upper drying chamber 3130.

Figure 15A:
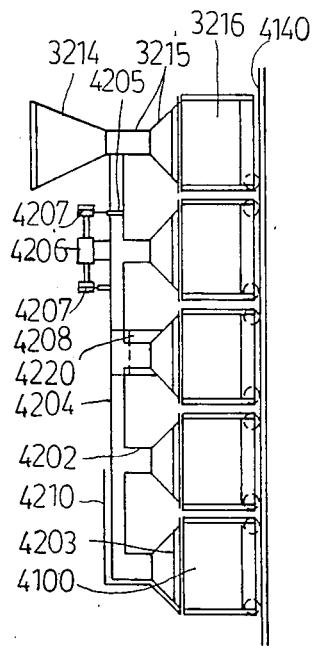
FIG. 15A is a side view showing a plurality of ash cars for an oxidizing means of a refuse disposing apparatus of the present invention.
Figure 15:
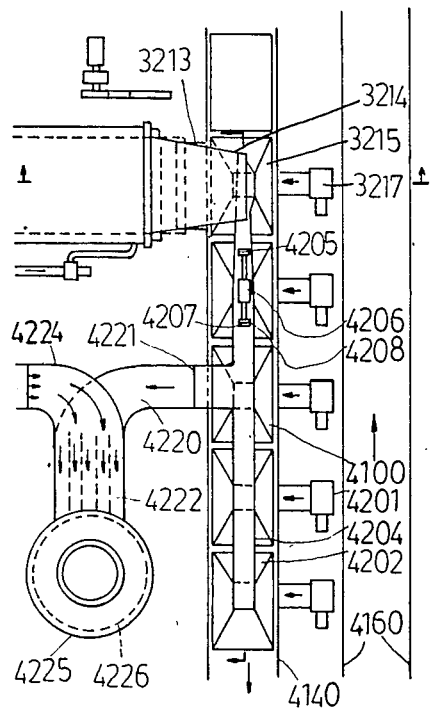
FIG. 15 is a top view showing the relationship between a burning means and a plurality of ash cars of an oxidizing means of a refuse disposing apparatus of the present invention.
Figure 16C:
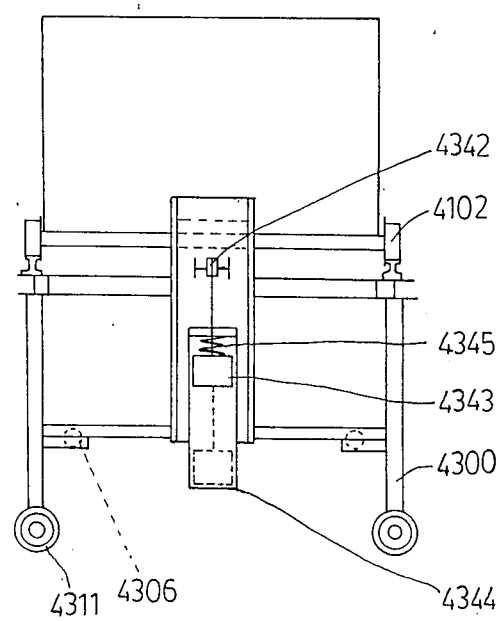
FIG. 16C is an end view showing an ash car in a transferring truck of a refuse disposing apparatus of the present invention.
Figure 16D:
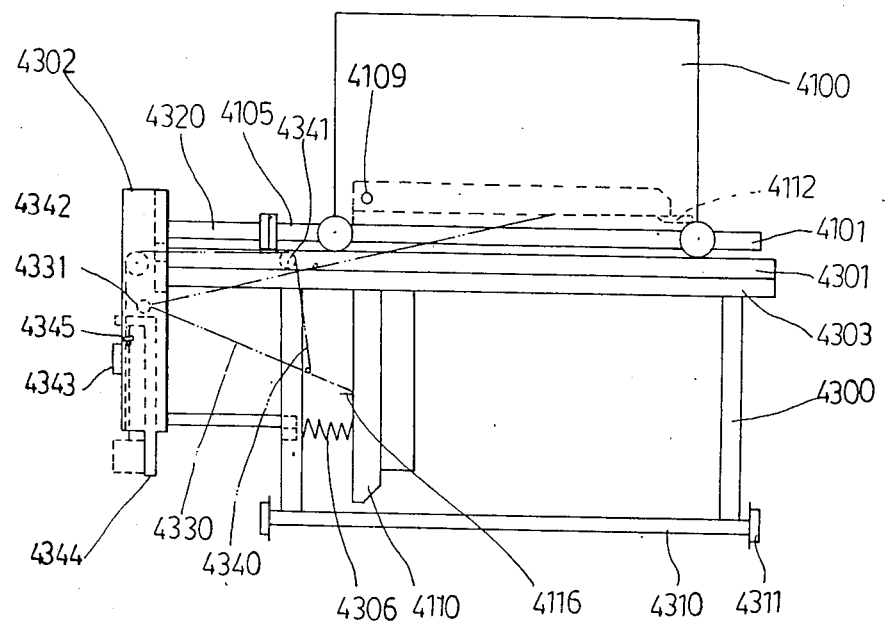
FIG. 16D is a side view showing an ash car in a transferring truck of a refuse disposing apparatus of the present invention.

Upon putting off the fire in combustion chamber 3202, the following steps can be adopted: (1) reducing the amount of the air coming from secondary air intake 3212; (2) stopping motor 3125; (3) fully and slowly burning refuse 2624 in combustion chamber 3202 and adjusting the air amount coming from blower 3152 to fully dry refuse 2624 in upper drying chamber 3130 to be capable of being fired easily the next time; (4) stopping blower 3210; (5) stopping motor 3220 and blower 3217; (6) stopping blower 3152 and motor 3162; (7) fully closing secondary air intake 3212; and (8) fully closing the chokers 4205 and 4221 as shown in FIGS. 15 and 15A.

Upon starting the fire in combustion chamber 3202, the following steps can be adopted; (1) starting air extracter 3160 and blower 3217 and opening choker 4205; (2) starting igniting with the aid of the hot air tube 3303, the burner 3301 and the blower 3302 driven by a motor 3304 supported on a frame 3305; (3) starting motors 3125, 3209 and 3220 immediately after the temperature shown on temperature gauge 3131 abruptly raises several degrees which shows that refuse 2624 in upper drying chamber 3130 is fired; (4) opening secondary air intake 3212 and starting blower 3152; (5) opening choker 4221; (6) starting feedwater pump 3218; and (7) adjusting the amount of the air supplied by blower 3152.

Certainly, the above described controls can all be computerized.

CHAPTER 3—POST-INCINERATION DISPOSAL

It has been described above that the difficult-to-oxidize residue will be oxidized in the ash cars, which is necessary in order to reduce the weight of the ash. Since the ash is very light, the air amount coming from the blowers for the ash cars except the first and second ones should be smaller in order not to carry the ash into the stack to pollute the atmosphere. Certainly, the number of the ash cars is to be determined by the quantity of the difficult-to-oxidize residue.

This chapter will be described in three sections: (1) the ash car and its rails; (2) the oxidization and utilization of the difficult-to-oxidize residue; and (3) the ash-unloading means.

SECTION 1—THE ASH CAR AND ITS RAILS

Ash car 3216 will be renumbered as 4100 in this chapter.

As shown in FIGS. 13 and 13A–13D, an oxidizing means 41 according to the present invention can be a plurality of ash cars 4100 being a container 4106 having an open top, an air intake 4114, a casing 4107 and refractory bricks 4108. Each ash car 4100 includes a bottom frame 4101 haing a front piece 4105, a rear piece 4104 and axles 4103 mounted thereon wheels 4102, a bottom plate 4110 attached thereon grate bars 4111 and having a front end pivotally connected to container 4106 by a pin 4109 pinning therethrough at a place near front piece 4105 and a rear end and a retaining piece 4112 springly connected to container 4106 near rest piece 4104 by a tension spring 4113 such that when retaining piece is externally applied a force the rear end is capable of being released by retaining piece 4112 and thus the rear end will fall down to unload the ash contained in container 4106, and when bottom plate 4110 is externally applied a force to upwardly urge against retaining piece 4112 the rear end is capable of rubbing against and through retaining piece 4112 to be retained thereon when the externally applied force is removed.

As shown in FIGS. 14, 14A and 14B, the rails for ash cars 4100 can include a pair of inner rails 4140 and a pair of outer rails 4160. Inner rails 4140 include a pair of flat rails 4141 having a level line 4146, a pair of inclined ash car-progressing rails 4142 having a first end connected to an end of flat rails 4141 and a second end and having a length capable of carrying thereon a plurality of ash cars 4100 and a pair of horizontal rails 4143 having a third end connected to the second end and a fourth end connected to a stopping frame 4145 and being lower than the first end. A conveyor 4151 is secured at the middle portion 4150 of inclined ash car-progressing rails 4142 and spacedly attached thereon a plurality of pulling pieces 4152 each of which is capable of engaging with bottom frame 4101 at a cushion plate 4115 to pull forward the respective ash car when which is fully loaded with the ash and the difficult-to-oxidize residue. Every adjacent two pulling pieces 4152 can be spaced within 1.05L where L is the length of an ash car 4100. Outer rails 4160 include a pair of inclined ash car-returning rails 4161 juxtaposed with inclined ash car-progressing rails 4142 and having a fifth end and a sixth end and a pair of crossover rails 4162 having a seventh end connected to horizontal rails 4143 and a eighth end connected to the sixth end.

The centerline 4147 of combustion chamber 3202 is also shown. Conveyor 4151 can be a chain guided by a flat piece 4153 and an inclined piece 4154 and conveyed by an active sprocket 4155, driven by a motor 4156, and a passive sprocket 4157. After ash car 4100 descending through the height difference H between the fifth end and the sixth end and impacting against a reactive piece 4144 springly attached to stopping frame 4145, it can automatically return to inclined ash car-progressing rails 4142 as will be described in more details later.

When ash car 4100 is to be fully loaded with the ash and the difficult-to-oxidize residue (if the refuse amount to be burnt in combustion chamber 3202 has been suitably adjusted to be constant, a timer can be used), the lower end of ash and difficult-to-oxidize exit 3213 is raised upwardly to temporarily collect the ash and the difficult-to-oxidize residue thereon. Then, motor 4156 is started to move conveyor 4151 a distance of 1.05L.

Then, the lower end of exit 3213 is repositioned to discharge therefrom the ash and the difficult-to-oxidize residue to the succeeding ash car. Then, close the choke 4208 and raise the choker 4205 as shown in FIGS. 15 and 15A as will be described later. These operations, which, certainly, can be computerized, however, can also be performed by using the microswitch, the magnetic switch and the hydraulic cylinder to reduce costs.

Ash car 4100 after pulled to falt rails 4141 by a pulling piece 4152 will separate therefrom and go toward the rails 4301 of a transferring truck 4300 by the inertial force thereof as will be described later.

SECTION 2—THE OXIDIZATION AND UTILIZATION OF THE DIFFICULT-TO-OXIDIZE RESIDUE

The difficult-to-oxidize residue oxidizes in ash car 4100 with the aid of the air supplied, through air intake 4114 and grate bars 4111, by blower 3217 and the hot gas thus obtained goes to fire tubes 3204 through casing 3215 and tube 3214.

Referring to FIGS. 15 and 15A, when the first ash car 3216 is fully loaded, it will be conveyed forwardly to be the second ash car 3216, and then to be the third, fourth, fifth . . . ash car 4100. The air supplied by blowers 4201 for ash cars 4100 after the second ash car should be reduced orderly. The bottom of the top casings 4202 for any one of the second to fifth ash cars 4100 should be provided a dusting net 4203 to prevent the dust contained in the hot gas resulted by ash cars 4100 from being discharged from the main stack 4225. If the second ash car still have organic materials to oxidize therein, then, choker 4208 should be closed and choker 4205 should be opened. The exhaust gas thus obtained will, through a hot gas manifold 4204, casing 3215 and tube 3214, enter into fire tubes 3204. If the second ash car has no organic materials to oxidize therein or has oxidized therein the organic materials, choker 4208 is raised up and choker 4205 is lowered down, through the medium of wires 4207, by a motor 4206. Now, the hot gas coming from the second to fifth ash cars will through manifold 4204, a choker 4221 and a main 4220 enter into a reheater 4222 which includes a plurality of compartments each of which mixes therein the hot gas coming from main 4220 and the water-scrubbed-cooled hot gas coming, through a tube 4224, from the water-scrubbing means as will be described later with the former positioned lower than the latter to obtain a hot gas having an averaged temperature to be discharged from stack 4225. Since the height of which is determined by the averaged temperature, it is preferable to have tubes anywhere applied the temperature retaining agent 4210 and the inner surface of stack 4225 paved with refractory bricks 4226. After putting off the fire in combustion chamber 3202, choker 4221 is closed to prevent the difficult-to-oxidize residue in the ash car 4100 from being fully oxidized to reserve it as the kindling for starting fire the next time.

SECTION 3—THE ASH-UNLOADING MEANS

As shown in FIGS. 16 and 16A–16D, an ash-unloading means 43 according to the present invention can include a transferring truck 4300 capable of carrying thereon ash car 4100 to be ash-unloaded coming from flat rails 4141 and a pair of transferring rails 4308 for transporting thereon transferring truck 4300 from where transferring truck 4300 is adjacent to flat rails 4141 to where adjacent to the fifth end for releasing ash car 4100 to the fifth end so that ash car 4100 is capable of descending from inclined ash car-returning rails 4161, through horizontal rails 4143, to return to inclined ash car-progressing rails 4142. This happens when rear piece 4104 impacts against reactive piece 4144 and the reaction force thus resulted can urge ash car 4100 to run, through horizontal rails 4143, over a height difference h to have cushion piece 4115 engaged with pulling piece 4152 as shown in FIGS. 14 and 14A and to impact upon the first ash car 3216 to stop there.

When front piece 4105 of ash car 4100 on rails 4301 secured on a securing frame 4303 of transferring truck 4300 impacts upon an air cylinder 4320 secured on a securing frame 4302 of transferring truck 4300, through a microswitch contact and an electromagnetic valve (not shown), a plunger piston 4321 of cylinder 4320 will inwardly move into cylinder 4320 to deform a linkage 4322 which, in turn, deforms a pair of scissors-type clips 4323 integrally connected thereon to firmly clip front piece 4105. Piston 4321 continues to inwardly move to secure ash car 4100 on transferring truck 4300. When piston 4321 is fully received in cylinder 4320, wheels 4102 will contact a microswitch (not shown) which results that an air cylinder 4304 mounted on securing frame 4303 will push retaining piece 4112 to fall down bottom plate 4110, which pivots about pin 4109, to unload the ash contained therein. Meanwhile, two shower heads 4305 jet high pressure water in order not to raise a terrible dust. Cylinder 4304 will automatically recover. After falling, bottom plate 4110 is cushioned by cushioning spring 4306 to alleviate the impact force upon transferring truck 4300 and the supporting frame thereof 4307. When dust is calm, shower heads 4305 shut off. Now, an air cylinder 4330 mounted at securing piece 4302 is activated to have the plunger piston thereof urged against a supporting point 4116 on bottom plate 4110 to pivotally upwardly raise bottom plate 4110 to be retained by retaining piece 4112. Certainly, cylinder 4330 pivots against a supporting point 4331 and has a front end fixed to a wire 4340. As the front end fixing wire 4340 gets higher, through pulleys 4341 and 4342, the weight 4343 will be lowered along a guiding plate 4344 secured on securing piece 4302. When bottom plate 4110 is retained by retaining piece 4112, the plunger piston of cylinder 4330 reaches its top dead point. At this time, a microswitch (not shown) will have the plunger piston of cylinder 4330 retracted in cylinder 4330. Thus, cylinder 4330 will separate from supporting point 4116 and immediately fall down. Because the provision of weight 4343, the falling speed of cylinder 4330 will not be too high. When cylinder 4330 is to reach its original position, weight 4343 impact upon a spring 4345 provided on securing piece 4302 to be cushioned. Thus, the ash-unloading work is performed. Now, two air cylinders 4320' mounted on a securing piece 4309 secured on the top side, viewed from FIG. 16, of supporting frame 4307 will push a first axle 4310 of transferring truck 4300, i.e. wheels 4311 of transferring truck 4300 will move on transferring rails 4308 so that transferring truck 4300 is transported from a place where it is adjacent to flat rails 4141 to a place adjacent to the fifth end where a second axle 4310 of transferring truck 4300 is clipped by two air cylinders 4320" mounted on a securing piece 4309' secured on the lower side, viewed with respect to FIG. 16, of supporting frame 4307. Subsequently, cylinder 4320 mounted on securing piece 4302 will push front piece 4105 of ash car 4100 and then release ash car 4100 to the fifth end of inclined ash car-returning rails 4161 to return to inclined ash car-progressing rails 4142 as described above.

After ash car 4100 leaves transferring truck 4300, cylinders 4320" mounted on securing piece 4309' will push transferring truck 4300 to return to the place adjacent to flat rails 4141 for ready to be on duty again.

CHAPTER 4—THE DISPOSALS OF THE EXHAUST GAS, THE FILTHY WATER AND THE ASH

After mixed with the cool air supplied by blower 3152, the flue gas resulted in combustion chamber 3202 is used to dry refuse 2624 in upper drying chamber 3130. The hot (exhaust) gas extracted from lower drying chamber 3140 by gas extractor 3160 is thus very dirty and filthy and thus should be water-scrubbed before discharged to the atmosphere. The filthy water coming from the water-scrubbing means can be concentrated by the steam coming from steam tube 3207 to become a liquid fertilizer to be mixed with the ash to obtain a compost. This chapter will be described in three sections: (1) the water-scrubbing means; (2) the filthy water-treating means; and (3) the disposal of the ash.

SECTION 1—THE WATER-SCRUBBING MEANS

The hot gas coming from gas extracter 3160 contains therein not only the dust but also refuse 2624 not combusted of small size. In addition to water-scrubbing the hot gas, it is necessary to separate refuse 2624 not combusted from the hot gas. It is necessary to separate the water beads and the water particles contained in the water-scrubbed hot gas from the hot gas. The water-scrubbed hot gas having a lowered temperature need be reheated as has been described in Section 2 in Chapter 3. Thus, the broad interpretation of the water-scrubbing means according to the present invention should contain the following functions: (1) water-scrubbing the hot gas; (2) separating refuse 2624 not combusted; (3) separating the water beads and the water particles from the hot gas; and (4) reheating the hot gas water-scrubbed.

A water-scrubbing means 5100 according to the present invention, as shown in FIGS. 17 and 17A–17C, can include an exhaust gas intake 5102 receiving exhaust gas coming from gas extracter 3160, a casing 5101 bigger than intake 5102 by several times to reduce the speed of the hot gas therein, a hot gas exit 5104, a water outlet 5105, a dust scrubber 511 for separating the dust contained in the exhaust gas by meeting the hot gas with a water, a disturbing room 5103 larger than dust scrubber 511 in volume to reduce the flowing speed of exhaust gas therein coming from dust scrubber 511, for further mixing the exhaust gas with the water coming from dust scrubber 5110 and separating the exhaust gas from the water, a dust collector 5130 for passing the hot gas and retaining thereon the dust in and the water beads formed in the hot gas coming from disturbing room 5103 and a water strainer 5150 for retaining thereon the water particles in the hot gas coming through dust collector 5130.

Figure 17:
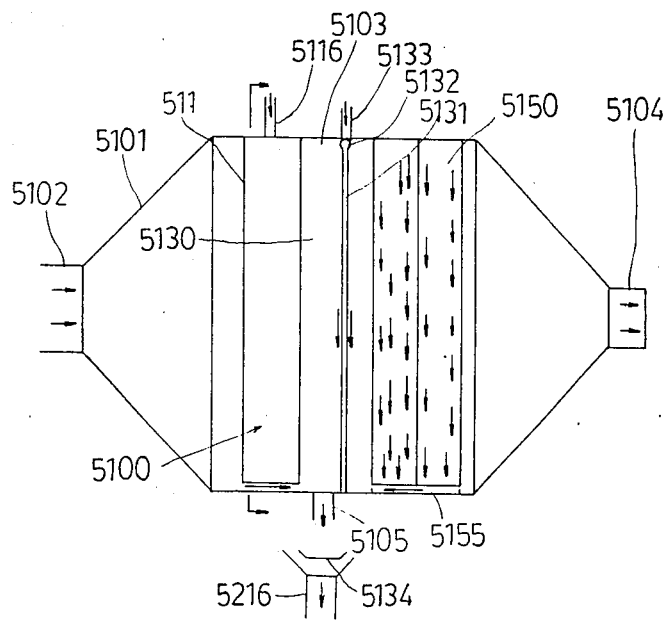
FIG. 17 shows a schematic longitudinal disposition of a water-scrubbing means of a refuse disposing apparatus of the present invention.
Figure 17A:
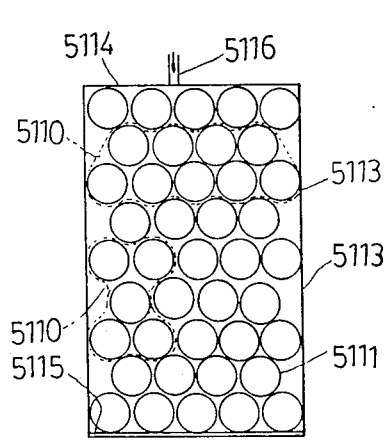
FIG. 17A shows an end view of a dust scrubber of a water-scrubbing means of a refuse disposing apparatus of the present invention.
Figure 17B:
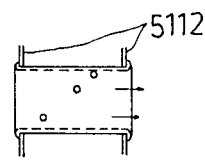
FIG. 17B is a side view showing a tube of a dust scrubber of a water-scrubbing means of a refuse disposing apparatus of the present invention.
Figure 17C:
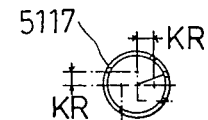
FIG. 17C is an end view showing a tube of a dust scrubber of a water-scrubbing means of a refuse disposing apparatus of the present invention.

Dust scrubber 511 includes at least one set of tubes 5110 which can be, e.g., either one of the two sets of tubes enclosed by the two dotted lines as shown in FIG. 17A, is externally water-pressurized and includes a plurality of tubes 5111 each of which includes a plurality of through holes 5117 which are distributed along a threadlike path on the external surface of each tube 5111 and each hole 5117 has an axis parallel to one of the diameter of each tube 5111 with the distance therebetween ranged from about 0.25R to about 0.75R wherein R is the radius of each tube 5111. Set of tubes 5110 is included and supported by a top plate 5114, a bottom plate 5115, two side plates 5113, two end plates 5112 having holes passing tubes 5111 and a water inlet tube 5116, mounted on top plate 5114, for water-pressuring set of tubes 5110. Thus, by the water, through the holes 5117, jetting into tubes 5111 meeting with the exhaust gas, coming from casing 5101, flowing in tubes 5111, the exhaust gas will flow in tubes 5111 in a screwy manner to fully mix with the jetted water to have the dust carried by the exhaust gas contained in the jetted water and to have the noxious gas such as the sulfur dioxide and the HCL to be solved in the jetted water to become the dilute sulfurous acid and hydrochloric acid respectively. After passing through set of tubes 5110, the exhaust gas enters into disturbing room 5103. Since dust scrubber 511 includes a plurality of sets of tubes 5110, it is preferable to have the screwy direction of the exhaust gas in tubes 5111 in one set of tubes 5110 different from that in another set of tubes 5110. Thus, after leaving sets of tubes 5110 of dust scrubber 511, the exhaust gas will further mix with the jetted water in disturbing room 5103 to have the jetted water fully contained or solving therein the dust, the refuse 2624 not combusted and the noxious gases originally carried by or mixed in the exhaust gas coming from intake 5102. Here, most of the jetted water falls down to water oulet tube 5105 for being recirculated to be used. The hot gas water-scrubbed will carry with it water beads in tubes 5111 and disturbing room 5103 and part of refuse 2624 not combusted not contained in jetted water falling down to water outlet tube 5105 to encounter with dust collector 5130.

Dust collector 5130 includes a plurality of inter-superimposed dust collecting nets 5131, a horizontal water distributing tube 5132 having the lower portion provided a longitudinal groove clamping therein dust collecting nets 5131, a water supplying tube 5133 mounted on the upper portion of water distributing tube 5132 for water supplying water distributing tube 5132 and a filtering net 5134. When the hot gas possibly carrying therein refuse 2624 not combusted encounters with dust collecting nets 5131, refuse 2624 not combusted of small size together with the water beads will be retained on dust collecting nets 5131 where refuse 2624 not combusted will, together with the water flowing on dust collecting nets 5131 coming from supplying tube 5133, fall down to bottom plate 5155 and then, go to outlet tube 5105 and filtering net 5134 where refuse 2624 not combusted is collected and sent to storage space 3101.

After refuse 2624 not combusted and water beads contained therein are retained on dust collector 5130, the hot gas still contains therein water particles which need be strained. Water strainer 5150 includes a frame (not shown) secured in casing 5101, straining media secured on the frame and a water passage 5155. The straining media should be fine fiber materials which can block the passing of the water particles but will not absorb the water.

After disposed by the above procedures, the exhaust gas has been taken out the dust and refuse 2624 not combusted originally contained therein to become a clean hot gas mixing therewith the steam which has a temperature of not enough high and need be reheated in reheater 4222 as has been described before.

SECTION 2—THE FILTHY WATER-TREATING MEANS

Sources of the filthy water have two one of which is coming from Sections 1 and 3–5 of Chapter 1 which is guided by a tube 5221 and has a smaller quantity and the other of which is coming from the water-scrubbing means 5100 above described which is guided by a tube 5216 and has a larger quantity. The most effective and economic disposing method of the filthy water is to concentrate it by the steam supplied by steam tube 3207 to obtain a liquid fertilizer by adding therein chemical fertilizers if necessary.

Figure 18:
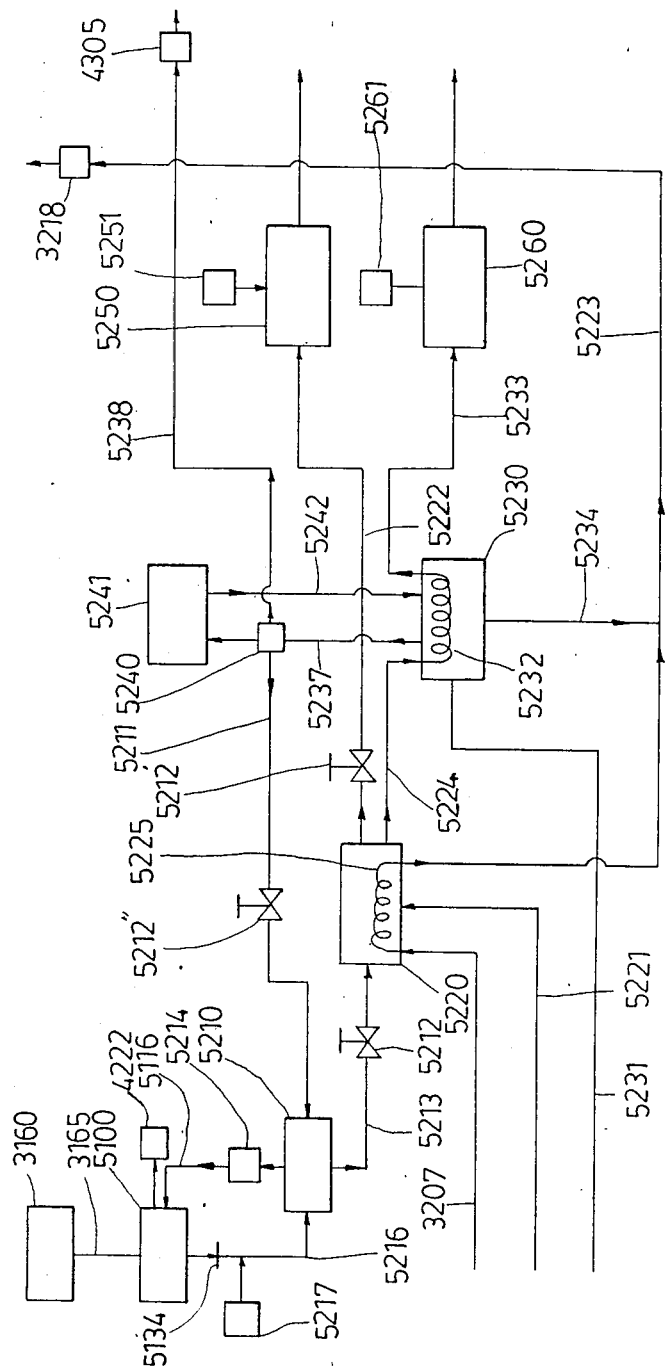
FIG. 18 shows a flow chart of a filthy water-treating means of a refuse disposing apparatus of the present invention.

A filthy water-treating means according to the present invention, as shown in FIG. 18, can include 5 pools: (1) a recirculating water pool 5210; (2) a filthy water concentrating pool 5220; (3) a clean water pool 5230; (4) a concentrated filthy water pool 5250; and (5) a condensing pool for the steam coming from filthy water concentrating pool 5220.

Recirculating water pool 5210 supplies the water needed by water-scrubbing means 5100 and can include a water inlet tube 5211, a valve 5212″, a water outlet tube 5213, a valve 5212, a pump 5214, tube 5116, a tube 5216 and a neutralizing agent adding port 5217 as shown in FIG. 18. Filthy water concentrating pool 5220 can include tube 5221, tube 5213, valve 5212, a tube 5222, a valve 5212′, steam tube 3207, condensed water tube 5223, a steam outlet tube 5224 and a heat-dissipating tube 5225 as shown in FIG. 18.

Clean water pool 5230 can include a water supplying tube 5231, tube 5224, a cooling tube 5232, a condensed water tube 5233, an auxiliary water supplying tube 5234, hot water tubes 5237, 5221 and 5238, a pump 5240, a cooling tower 5241 and a cooled water tube 5242 as shown in FIG. 18.

Concentrated filthy water pool 5250 can include a chemical fertilizer adding pool 5251. Here, the filthy water should be concentrated as possible as it can be in order to improve its fertility.

Condensing pool for the steam coming from filthy water concentrating pool 5220 can include a chemical agent adding pool 5261. The steam coming from filthy water concentrating pool 5220 has bad smell and thus should be cooled and condensed. Whether the water thus obtained is to be reused or discharged, it should be added with suitable chemicals, if necessary, after analyzed.

From the arrows shown in this figure, one should be able to understand the operation and function of the present filthy water-treating means.

SECTION 3—THE DISPOSAL OF THE ASH

Figure 19:
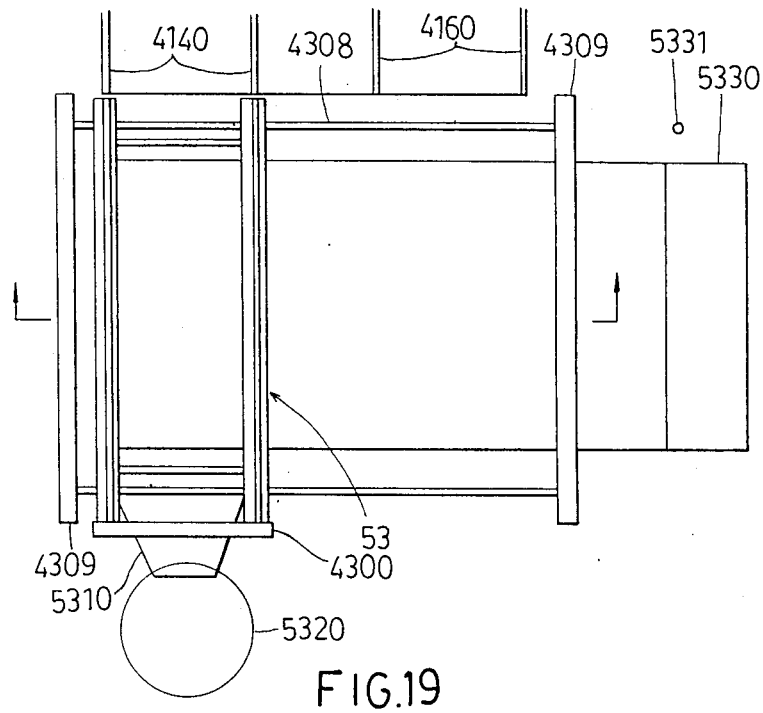
FIG. 19 shows a top view of an ash collector of a refuse disposing apparatus of the present invention.
Figure 19A:
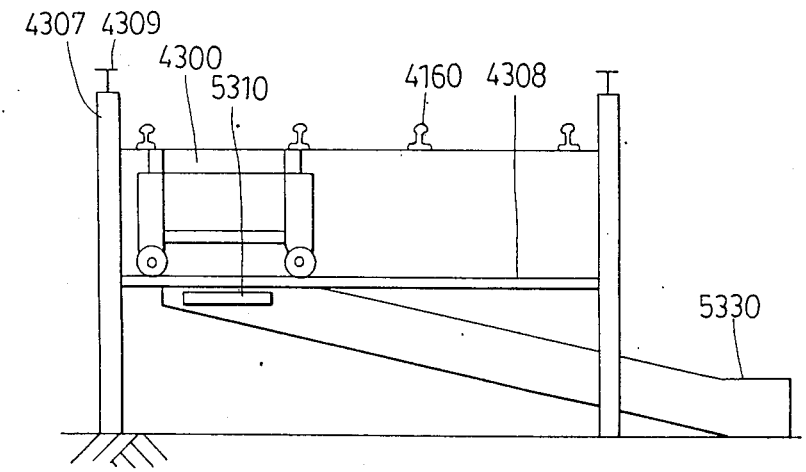
FIG. 19A shows a side view of an ash collector of a refuse disposing apparatus of the present invention.

An ash collecting means 53 according to the present invention, as shown in FIGS. 19 and 19A, can include an oscillating sieve 5310, a sand and rock storing tank 5320 and an ash collecting container 5330.

Upon oscillating sieve 5310 receiving thereon the ash unloaded from ash car 4100, it is energized to be oscillating. The ash is sieved by oscillating sieve 5310 and falls down into ash collecting container 5330 where the ash is stirred and mixed with the concentrated filthy water coming from the tube 5331 to obtain a fertilizer which can be sold. Those which like the sand and the rock . . . cannot pass through oscillating sieve 5310 will, through the oscillation of oscillating sieve 5310, fall into sand and rock storing tank 5320 from the bottom of which the sand and the rock contained therein can be loaded in a truck to be disposed.

While the present invention has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:

1. A refuse disposing method comprising the steps of:

(a) gathering the refuse at a first place;
(b) spreading said refuse from said place;
(c) magnetically stripping ferruginous materials from said refuse at step (b);
(d) sawing said refuse into smaller ones;
(e) magnetically restripping ferruginous materials contained in said refuse;
(f) crushing said refuse;
(g) folding said refuse;
(h) dewatering said refuse;
(i) re-sawing and shearing said refuse into smaller ones;
(j) evenly distributing said refuse at a said second place;
(k) burning said refuse at a combustion chamber with said refuse acting as fuels;
(l) drying said refuse at said second place by the heat generated in said combustion chamber;
(m) preheating said refuse before it is in said combustion chamber by the heat generated in said combustion chamber;
(n) oxidizing the difficult-to-oxidize residue in said refuse at a plurality of ash cars;
(o) water-scrubbing a flue gas obtained from said second place; and
(p) preparing a fertilizer by mixing together a water after used in step (o) and an ash obtained from said ash cars.

2. An apparatus for refuse disposing comprising:
a refuse gathering means for gathering therein a refuse;
a refuse spreading means for spreading said refuse from said gathering means;
a refuse magnetically stripping means for stripping ferruginous materials from said refuse from said spreading means;
a refuse burning means for burning said refuse;
a preheating means for preheating said refuse from said refuse magnetically stripping means before said refuse is to be burned;
said refuse spreading means includes:
  a first tearing drum horizontally mounted beneath said gathering means and rotating in a first direction;
  a second tearing drum juxtaposed beside said first tearing drum and rotating in a second direction opposite to said first direction, said second and first tearing drums having a center-to-center distance larger than the sum of the radii thereof by an amount of G;
  a plurality of L-shaped pieces having the vertical portions thereof respectively and perpendicularly attached to the peripheral surfaces of said tearing drums so that said tearing drums can receive said refuse from said gathering means and tear said refuse therebetween by said L-shaped pieces;
  a first releasing drum having a diameter smaller than each of those of said first and second tearing drums, mounted at a place near the lower portion of said first tearing drum and rotating in said second direction, said first releasing and tearing drums having a center-to-center distance larger than the sum of the radii thereof by an amount approximately equal to said G;
  a second releasing drum having a diameter smaller than each of those of said first and second tearing drums, mounted at a place near the lower portion of said second tearing drum and rotating in said first direction, said second releasing and tearing drums having a center-to-center distance larger than the sum of the radii thereof by an amount approximately equal to said G; and
  a plurality of straight pieces having the length thereof approximately equal to that of said vertical portions and respectively and perpendicularly secured to peripheral surfaces of said first and second releasing drums so that said straight pieces can release the refuse which is attached to said vertical portions.

3. An apparatus as claimed in claim 1 wherein said burning means includes:
a combustion chamber;
a chain grate stoker, mounted in said combustion chamber, for conveying said refuse for being burnt thereon; and
a steam generator, mounted in said combustion chamber, for generating steam by the heat of the hot gas obtained from said combustion chamber.

4. An apparatus as claimed in claim 3 wherein said preheating means includes a preheating chamber, connected to said combustion chamber, for preheating said refuse before which is to be burnt in said combustion chamber by the heat of the hot gas obtained from said combustion chamber and not used for generating said steam.

5. An apparatus for refuse disposing comprising:
a refuse gathering means for gathering therein a refuse;
a refuse spreading means for spreading said refuse from said gathering means;
a refuse magnetically stripping means for stripping ferruginous materials from said refuse from said spreading means;
a refuse burning means for burning said refuse;
a preheating means for preheating said refuse from said refuse magnetically stripping means before said refuse is to be burned;
said refuse magnetically stripping means includes:
  a first flat belt conveyor for conveying said refuse after torn;
  a magnet held above said first flat belt conveyor;
  a non-magnetic cover covering said magnet;
  two tubular pieces respectively held above the two sides of said conveyor and each having a longitudinal groove;
  two cam rods respectively received in said two tubular pieces and each of which has a right-handed thread and a left-handed thread and has an end thereof adapted to be secured thereon a sprocket engaged with a motor actuated chain;
  two follower pieces, through said longitudinal grooves, respectively engaging with said cam rods so that said follower pieces will move in a first direction when engaging with said right-handed threads on said cam rods when rotated and will move in a second direction opposite to said first direction when engaging with said left-handed threads;
  two receiving containers held beneath the two ends of said cover and each attached at the top thereof to a stopping plate;
  a scraping plate having two ends thereof respectively secured to said follower pieces and having the top side thereof capable of scraping against said cover for scraping down said ferruginous materials attracted on said cover; and a receiving plate, slidably received at the bottom side of said scraping plate, for receiving said ferruginous materials scraped down by said scraping plate so that when said follower pieces move in one of said directions to a predetermined position, said receiving plate will be stopped by said stopping plate and slide backwards in the other of said directions to cause said ferruginous materials to fall into one of said receiving containers.

6. An apparatus for refuse disposing comprising:
a refuse gathering means for gathering therein a refuse;
a refuse spreading means for spreading said refuse from said gathering means;
a refuse magnetically stripping means for stripping ferruginous materials from said refuse from said spreading means;
a refuse burning means for burning said refuse;
said burning means includes:
  a combustion chamber;
  a chain grate stoker, mounted in said combustion chamber, for conveying said refuse for being burnt thereon;
a steam generator, mounted in said combustion chamber, for generating stem by the heat of the hot gas obtained from said combustion chamber;
said refuse gathering means is a hopper for receiving therein a refuse;
a drying means, for drying said refuse before it is preheated in said preheating chamber, which includes:
  a drying chamber having an upper drying chamber connected to said preheating chamber and a lower drying chamber; and
  a grate-like member disposed in said drying chamber for separating said upper and lower drying chambers, carrying said refuse thereon to be dried by said hot gas after which is used to generate said steam and preheat said refuse and having a plurality of openings for passing said hot gas from said upper drying chamber into said lower drying chamber.

7. An apparatus as claimed in claim 6, further comprising a water-scrubbing means for water-scrubbing said hot gas in said lower drying chamber, since it is very dirty and dusty and contains therein particles of not-combusted refuse.

8. An apparatus as claimed in claim 7 wherein said water-scrubbing means includes:
a dust scrubber for separating the dust contained in said hot gas by meeting said hot gas with a water;
a disturbing room for further mixing said hot gas with said water coming from said dust scrubber and separating said hot gas from said water;
a dust collecter for passing said hot gas and retaining thereon said dust in and the water beads formed in said hot gas coming from said disturbing room; and
a water strainer for retaining thereon the water particles in said hot gas coming through said dust collecter.

9. An apparatus as claimed in claim 8 wherein said dust scrubber includes at least one set of tubes which is externally water-pressurized and includes a plurality of tubes each of which includes a plurality of through holes which are distributed along a threadlike path on the external surface of each of said tube and each of said holes has an axis parallel to one of the diameter of said each tube with the distance therebetween ranged from about 0.25R to about 0.75R wherein R is the radius of said each tube.

10. An apparatus for refuse disposing comprising:
a refuse gathering means for gathering therein a refuse;
a refuse spreading means for spreading said refuse from said gathering means;
a refuse magnetically stripping means for stripping ferruginous materials from said refuse from said spreading means;
a refuse burning means for burning said refuse;
a preheating means for preheating said refuse from said refuse magnetically stripping means before said refuse is to be burned;
a drying mans for drying said refuse before it is to be preheated in said preheating means;
a crushing means for crushing said refuse before which is to be dried in said drying means;
a folding means for folding said refuse after crushed by said crushing means;
said folding means is a casing which includes:
  a first open end having a depth and a width capable of receiving said refuse after crushed by said crushing means;
  a transition intermediate connected to said first open end and capable of folding said refuse into a plurality of plies having a width correspondingly reduced; and
  a second open end having a width approximately equal to each of those of said plies and a depth approximately equal to the sum of those of said a plurality of plies of said refuse.

11. An apparatus for refuse disposing comprising:
a refuse gathering means for gathering therein a refuse;
a refuse spreading means for spreading said refuse from said gathering means;
a refuse magnetically stripping means for stripping ferruginous materials from said refuse from said spreading means;
a refuse burning means for burning said refuse;
a preheating means for preheating said refuse from said refuse magnetically stripping means before said refuse is to be burned;
a drying means for drying said refuse before it is to be preheated in said preheating means;
a crushing means for crushing said refuse before which is to be dried in said drying means;
a folding means for folding said refuse after crushed by said crushing means; and
a dewatering means for dewatering said refuse after folded by said folding means.

12. An apparatus as claimed in claim 11 wherein said dewatering means includes:
a plurality of plates tandem disposed to constitute a conveying loop having a conveying speed S for conveying said refuse coming from said folding means and each having a plurality of holes thereon for passing therefrom the water contained in said refuse;
two side baffles, respectively attached to the two sides of said plates, for preventing said refuse from expanding sidewards on said plates;
a first pair of dewatering drums separated by said conveying loop, having a center-to-denter distance larger than the sum of the radii thereof by an amount of G4 smaller than the thickness of a plurality of plies of folded refuse, for passing therebetween said refuse being conveyed by said conveying loop to dewater the water contained in said refuse, and having a peripheral speed equal to said S;

a second pair of dewatering drums separated by said conveying loop, having a center-to-center distance larger than the sum of the radii thereof by an amount of G5 smaller than said G4, for passing therebetween said refuse being conveyed by said conveying loop after dewatered by said first pair of dewatering drums to further dewater the water contained in said refuse, and having a peripheral speed equal to said S; and a third pair of dewatering drums separated by said conveying loop, having a center-to-center distance larger than the sum of the radii thereof by an amount of G6 smaller than said G5, for passing therebetween said refuse being conveyed by said conveying loop after dewatered by said second pair of dewatering drums to dewater the water conained in said refuse again, and having a peripheral speed equal to said S.

13. An apparatus as claimed in claim 11 wherein said dewatering means includes:
   an endless belt acting as a conveying loop for conveying said refuse coming from said folding means;
   a pair of upper baffles, respectively secured at the top of the two sides of said endless belt, for preventing said refuse from expanding sidewards on said endless belt;
   a lower pair of baffles respectively secured at the bottom of the two sides of said endless belt and cooperating with said upper pair of baffles to form therebetween two grooves respectively receiving therein said two sides of said endless belt; and
   a first pair of dewatering drums, a second pair of dewatering drums and a third pair of dewatering drums.

14. An apparatus as claimed in claim 11, further comprising a sawing means for sawing said refuse into smaller ones after stripped by said refuse magnetically stripping means.

15. An apparatus as claimed in claim 14 wherein said sawing means includes:
   a first shaft adapted to be driven by a motor;
   a first drum coaxially secured to said first shaft for passing said refuse thereon and having a plurality of circular grooves spacedly distributed along the axis thereof;
   a second shaft adapted to be driven by a motor; and
   a second drum coaxially secured to said second shaft and having a plurality of circular sawing tools which are spacedly distributed along the axis thereof and protrude in said grooves respectively for cooperating with said first drumm to saw said refuse into smaller ones.

16. An apparatus as claimed in claim 14, further comprising a refuse re-sawing means and a shearing means for re-sawing and shearing said refuse into further smaller ones after dewatered by said dewatering means.

17. An apparatus as claimed in claim 16, wherein:
   said re-sawing means for re-sawing said refuse after being dewatered includes:
   a first shaft adapted to be driven by a motor;
   a first drum coaxially secured to said first shaft for passing said refuse thereon and having a plurality of circular grooves spacedly distributed along the axis thereof;
   a second shaft adapted to be driven by a motor; and
   a second drum coaxially secured to said second shaft and having a plurality of circular sawing tools which are spacedly distributed along the axis thereof and protrude in said grooves respectively for cooperating with said first drum to saw said refuse into smaller ones;
   said shearing means includes:
   a lower shearing tool;
   an upper shearing tool capable of cooperating with said lower shearing tool to shear said refuse after being re-sawed by said re-sawing means;
   a pressing plate springly attached to said upper shearing tool for pressing said refuse against said lower shearing tool when said upper shearing tool is to cooperate with said lower shearing tool to shear said refuse;
   a hydraulic cylinder having a plunger capable of being in a first position when said upper and lower shearing tools cooperate to shear said refuse and in a second position when said upper shearing tool separates from said lower shearing tool; and
   a cushioning conveying mechanisnm, having a first end pivotally fixed at a position near said lower shearing tool and a second end connected to said plunger, for conveying said refuse after re-sawn by said re-sawing means to be sheared by said shearing means wherein the differential amount of said refuse between said re-sawing means and said shearing means when said plunger is in said firsgt and second positions respectively is that which will be sheared by said upper and lower shearing tools at a time.

18. An apparatus as claimed in claim 16, further comprising a distributing means for evenly distributing said refuse before said refuse is to be dried in said drying means.

19. An apparatus as claimed in claim 18 wherein said distributing means includes:
   an inclined distributing trough having the top thereof pivotally fixed beneath the bottom of said lower shearing tool for receiving therefrom said refuse after shorn and having a longitudinal groove at the bottom side of the upper portion thereof;
   a rotating disk adapted to be driven by a motor; and
   a pin secured to said rotating disk and capable of engaging in said longitudinal groove so that when said rotating disk rotates the lower end of said distributing trough will oscillate within a particular range.

20. An apparatus as claimed in claim 18, further comprising a refuse magnetically re-stripping means for magnetically re-stripping ferruginous materials contained in said refuse after sawn by said sawing means.

21. An apparatus as claimed in claim 20 wherein said refuse magnetically re-stripping means includes:
   a flat belt conveyor for conveying said refuse after sawn;
   a magnet held above said flat belt conveyor; and
   a non-magnetic cover, two tubular pieces, two cam rods, two follower pieces, two receiving containers, a scraping plate perpendicularly secured to peripheral surfaces of said first and second releasing drums so that said straight pieces can release the refuse which is attached to said vertical portions and a receiving plate slidably received at the bottom side of said scraping plate, for receiving said ferruginous materials scraped down by said scraping plate so that when said follower pieces move in one direction to a predetermined position, said plate will be stopped by a stopping plate attached to said containers and slide backwards in an opposite direction to cause said ferruginous material to fall into one of said receiving containers.

22. An apparatus as claimed in claim 20, further comprising an oxidizing means for oxidizing the difficult-to-oxidize residue in said refuse after burnt by said burning means.

23. An apparatus as claimed in claim 22 wherein said oxidizing means is a plurality of ash cars each of which is to receive therein the ash and said difficult-to-oxidize residue coming from said burning means, is a container having an open top and includes:

a bottom frame having a front piece, a rear piece and two axles mounted thereon wheels;

a bottom plate having a front end pivotally connected to said container near said front piece and a rear end; and a retaining piece springly connected to said container near said rear piece such that when said retaining piece is externally applied a force said rear end is capable of being released by said retaining piece and thus said rear end will fall down to unload the ash contained in said container, and when said bottom plate is externally applied a force to upwardly urge against said retaining piece said rear end is capable of rubbing against and through said retaining piece to be retained thereon when said externally applied force is removed.

24. An apparatus as claimed in claim 23, further comprising:

a pair of inclined ash car-progressing rails having a first end and a second end and having a length capable of carrying thereon said a plurality of ash cars;

a pair of horizontal rails having a third end connected to said second end and a fourth end connected to a stopping frame, and being lower than said first end;

a conveyer secured at the middle portion of said inclined ash car-progressing rails and spacedly attached thereon a plurality of pulling pieces each of which is capable of engaging with said bottom frame to pull forward the respective ash car when which is fully loaded with said ash and said difficult-to-oxidize residue;

a pair of inclined ash car-returning rails juxtaposed with said inclined ash car-progressing rails and having a fifth end and a sixth end;

a pair of crossover rails having a seventh end connected to said horizontal rails and a eighth end connected to said sixth end;

a transferring truck capable of carrying thereon the ash car to be ash-unloaded coming from said first end; and a pair of transferring rails for transporting thereon said transferring truck from where adjacent to said first end to where adjacent to said fifth end for releasing said ash car to said fifth end so that said ash car is capable of descending from said inclined ash car-returning rails, through said horizontal rails, to return to said inclined ash car-progressing rails.

25. An apparatus as claimed in claim 22, further comprising a water-scrubbing means for water-scrubbing said hot gas obtained from said drying means.

26. An apparatus as claimed in claim 25, further comprising a filthy water-treating means for treating the filthy water coming from said dewatering means and said water-scrubbing means.

27. An apparatus as claimed in claim 26, further comprising a fertilizer preparer for preparing a fertilizer constituted by the water coming from said filthy water-treating means and the ash coming from said burning means and said oxidizing means.

* * * * *